(12) United States Patent
Nagae et al.

(10) Patent No.: US 6,335,734 B1
(45) Date of Patent: Jan. 1, 2002

(54) COLOR CONVERTING METHOD

(75) Inventors: Akiko Nagae; Masayoshi Shimizu; Shoji Suzuki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/304,671

(22) Filed: May 4, 1999

(30) Foreign Application Priority Data

Nov. 26, 1998 (JP) .................................................. 10-335460

(51) Int. Cl.$^7$ ............................... G06K 9/00; H04N 7/00; G03F 3/08
(52) U.S. Cl. .......................... 345/589; 345/591; 345/606; 348/444; 348/453; 348/496; 358/518; 358/525; 382/162; 382/300
(58) Field of Search ..................................... 348/444, 450, 348/453, 488, 496, 557, 612, 599, 645, 663, 713, 717, 807; 382/162–165, 167, 300; 358/515–520, 523–525; 345/591, 589, 593, 597, 600, 601, 604, 606, 609–610

(56) References Cited

U.S. PATENT DOCUMENTS

| | | | | |
|---|---|---|---|---|
| 6,011,595 A | * | 1/2000 | Henderson | 348/590 |
| 6,049,399 A | * | 4/2000 | Shyu | 358/520 |
| 6,108,098 A | * | 8/2000 | Owada | 358/1.14 |
| 6,128,407 A | * | 10/2000 | Inoue | 382/167 |
| 6,211,917 B1 | * | 4/2001 | Shyu | 348/453 |
| 6,262,817 B1 | * | 7/2001 | Sato | 358/518 |
| 6,268,939 B1 | * | 7/2001 | Klassen | 358/518 |
| 6,278,805 | * | 8/2001 | Gregory, Jr. | 382/276 |

FOREIGN PATENT DOCUMENTS

| | | | | |
|---|---|---|---|---|
| JP | 11-275375 | * | 3/1998 | G06T/1/00 |
| JP | 2000-184224 | * | 6/2000 | G06T/1/00 |

OTHER PUBLICATIONS

"Color Transformation by Slant–Prism Interpolation", by Tenrou Fumoto, et al., Journal of Electric Imaging, vol. (27)3, 1998, pps. 233–240.

* cited by examiner

Primary Examiner—Matthew Luu
Assistant Examiner—Wesner Sajous
(74) Attorney, Agent, or Firm—Staas & Halsey LLP

(57) ABSTRACT

In addition to linear conversion parameters V1 to V8 which are used in an interpolation calculation, non-linear conversion parameters VV1 to VV8 are calculated. Each time an input color is fetched, whether the linear conversion parameters are used or the non-linear conversion parameters are used is discriminated. The interpolation calculation of a high precision using the non-linear conversion parameters is performed for a region where it is necessary to guarantee a gradation, thereby preventing a reversal of an output color in a region including an achromatic gradation axis. Regions other than such a region are processed by the interpolation calculation using the linear conversion parameter at a high speed.

11 Claims, 18 Drawing Sheets

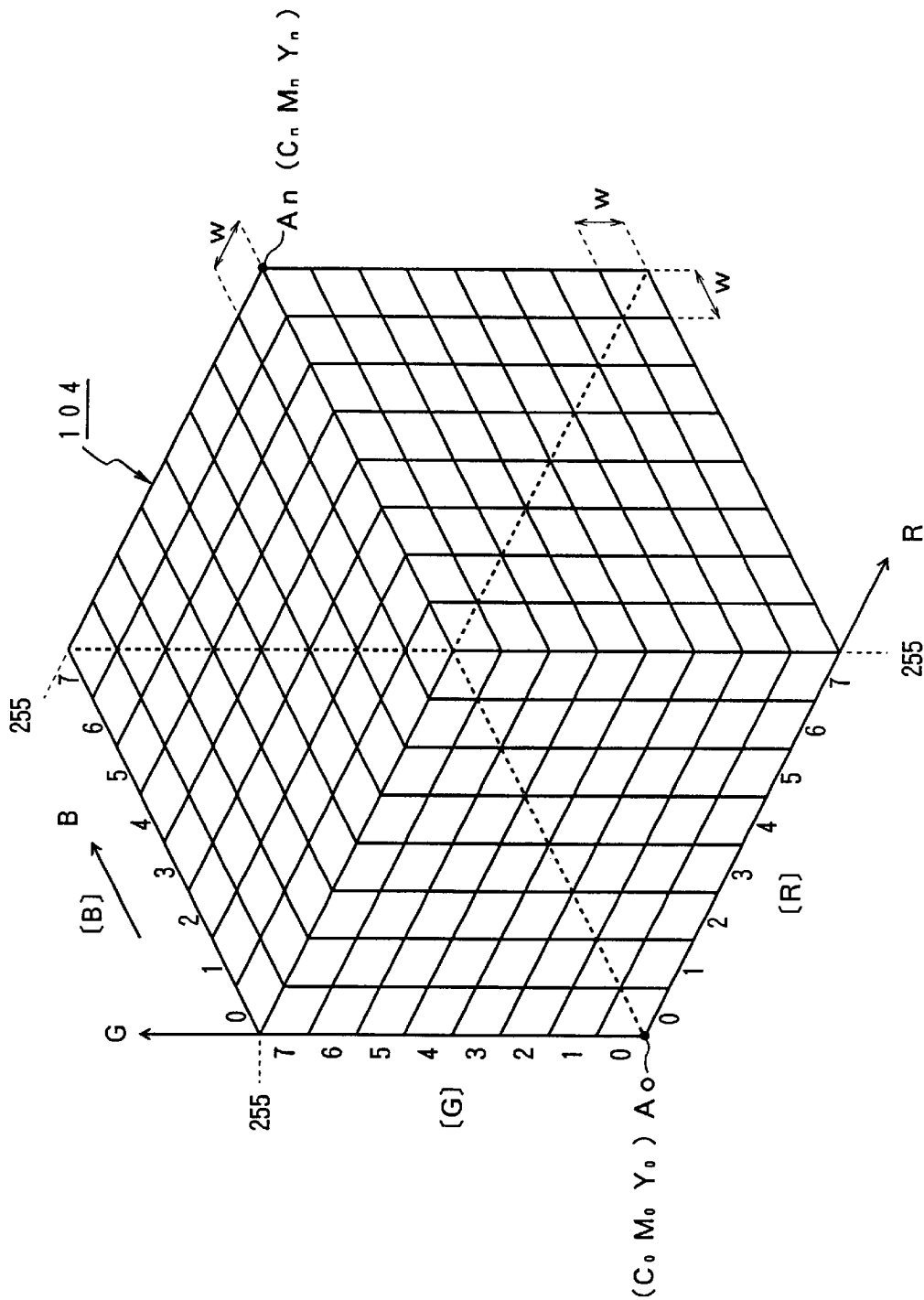

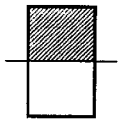
FIG. 13A
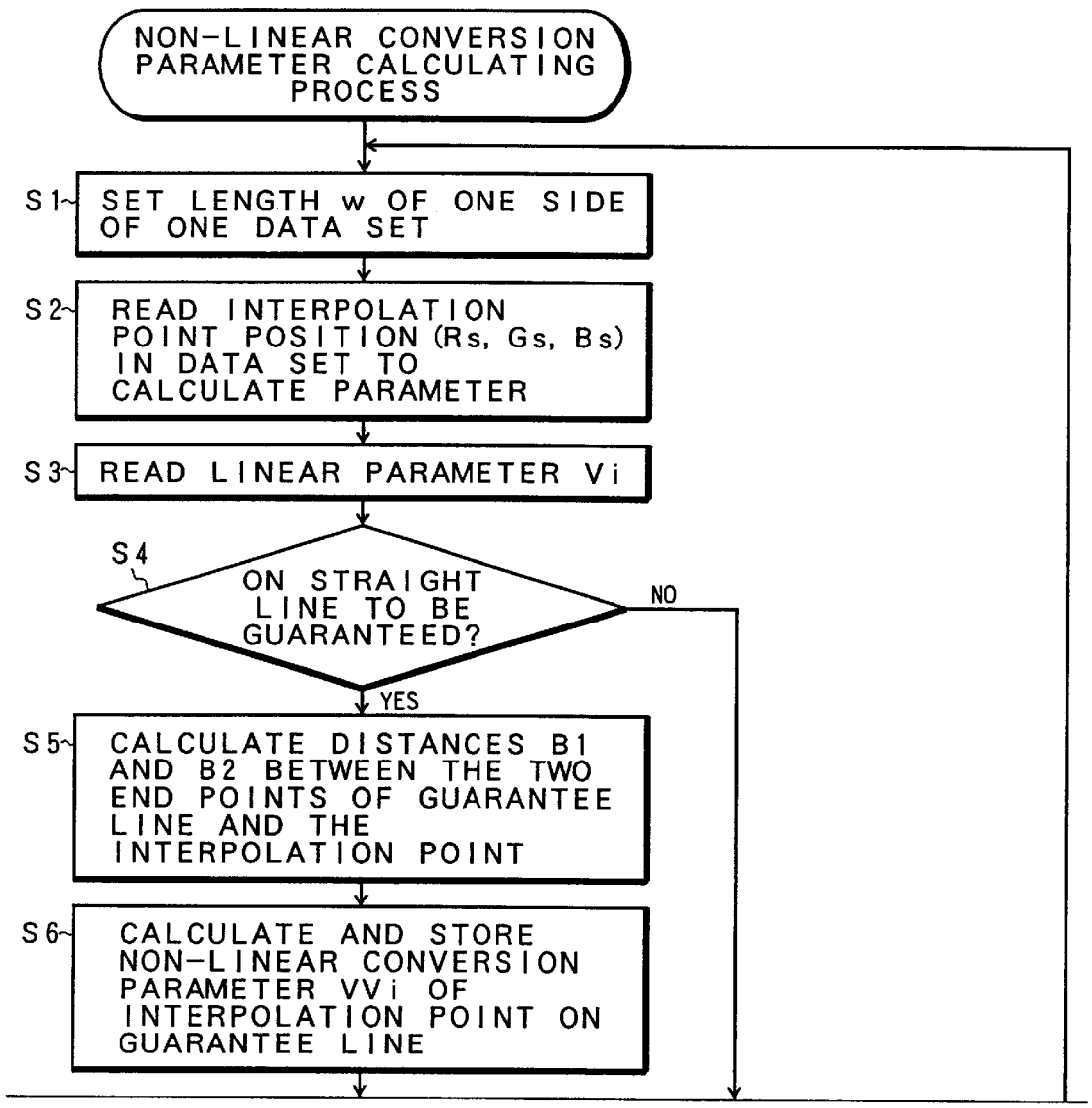

FIG. 13B
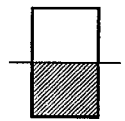
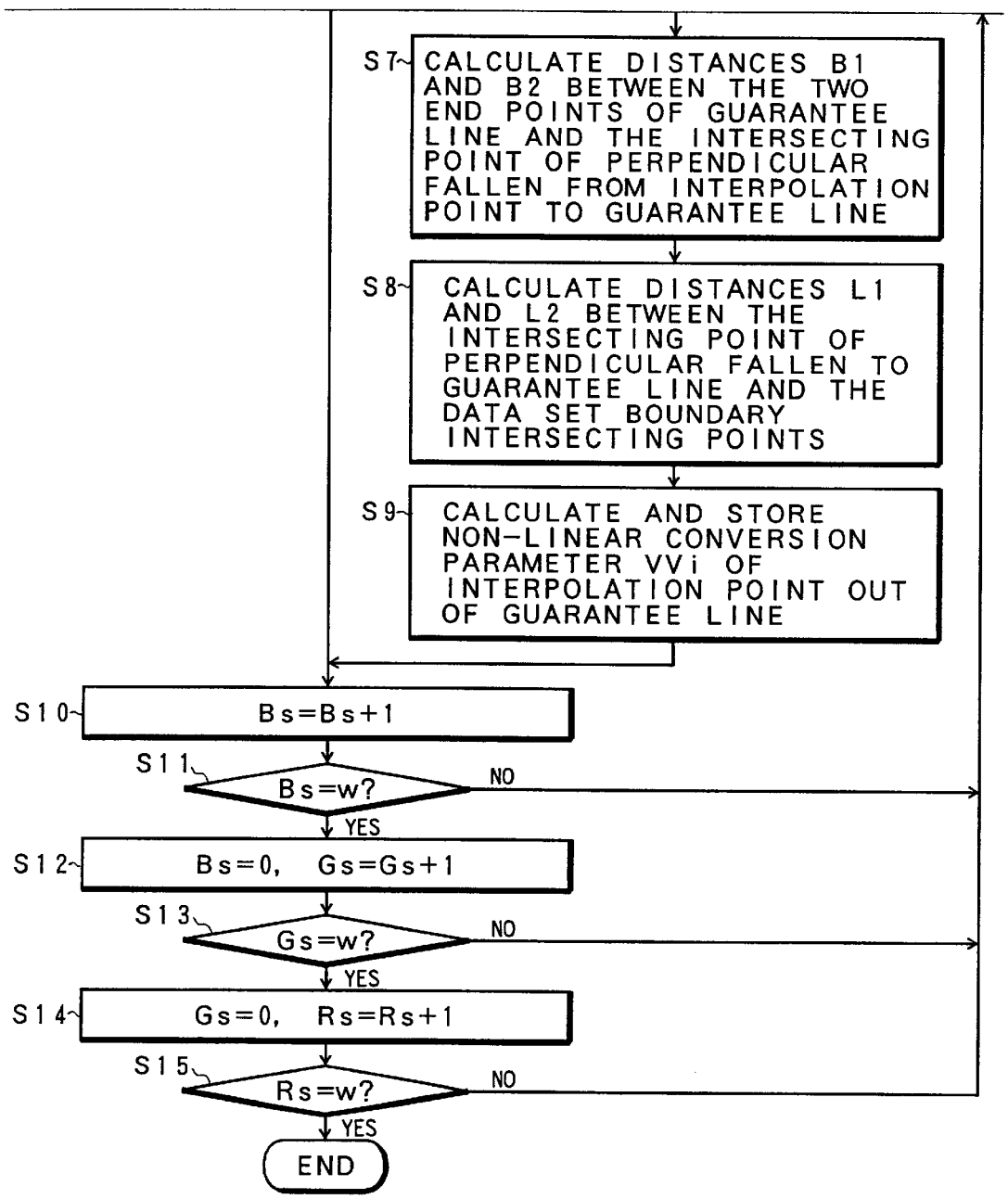

COLOR CONVERTING METHOD

BACKGROUND OF THE INVENTION

1. Field of the Invention

The present invention relates to a color converting method of converting a chrominance signal of a different color space by using a multidimensional color conversion table and, more particularly, to a color converting method of converting a chrominance signal which is not registered in a conversion table by an interpolation calculation.

2. Description of the Related Arts

Color image apparatuses such as personal computer, color printer, digital camera, and the like are at present being widespread owing to the realization of high performance and low costs. Generally, the apparatus such as printer, display, or the like expresses a color of an RGB space, a CMY space, or the like of a primary color system. In this case, since the color that is outputted from the RGB space or CMY space differs depending on the apparatus such as a display or a printer, it can be regarded as a chrominance signal depending on the apparatus. In order to make the colors coincide among the different apparatuses, as a chrominance signal showing an absolute color that does not depend on the apparatus, there is a method of processing the chrominance signal by using an L*a*b* space, an XYZ space, or the like of a luminance color difference separation system as a reference. For example, when the color of the L*a*b* space is outputted to a printer, if the color of the L*a*b* space is converted to the color of the CMY space peculiar to the printer and the chrominance signal is printed, fundamentally, any printer can output the same color. A technique for converting the chrominance signal between the different color spaces is called a color converting technique. As such a color converting technique, a color conversion using a multidimensional conversion table (multidimensional look-up table) has been known.

FIGS. 1A to 1C are explanatory diagrams of a multidimensional conversion space to realize the multidimensional conversion table. FIG. 1A shows an RGB/Lab conversion coordinates space 100 to convert the color from the RGB space to the L*a*b* space. FIG. 1B shows an Lab/CMY conversion coordinates space 102 to convert the color from the L*a*b* space to the CMY space. Further, FIG. 1C shows an RGB/CMY conversion coordinates space 104 to convert the color from the RGB space to the CMY space. For instance, when the color of the RGB space of a display is converted to the color of the CMY space of a printer, RGB color values are inputted to the RGB/Lab conversion coordinates space 100 of FIG. 1A, thereby converting to L*a*b* color values. Subsequently, the L*a*b* color values are inputted to the Lab/CMY conversion coordinates space 102 of FIG. 1B, thereby converting to CMY color values. Practically, the RGB/CMY conversion coordinates space 104 in which the conversion to the intermediate L*a*b* space as shown in FIG. 1B is omitted is used. The RGB color values are inputted to the RGB/CMY conversion coordinates space 104 and are directly converted to the CMY color values. In such a multidimensional conversion table, output representative colors of the color space on the conversion destination side are set to lattice points which are decided by input representative colors of the color space serving as a converting source. The table is used in combination with an interpolation calculating mechanism, so that the high-speed and accurate color conversion can be realized by a small memory capacity of the table.

As an interpolating method in the conventional color converting method in which the multidimensional conversion table and the interpolation calculating mechanism are combined, a cube interpolating method (Cube Algorithm) has been known. According to the cube interpolating method, as for the multidimensional conversion space constructed by a set of lattice points having a predetermined width constructing the multidimensional conversion table, an output color corresponding to an input color at an arbitrary position existing in a lattice space is obtained from output colors set at eight vertices of the lattice space constructing a cube by an interpolation calculation. The cube interpolating method will be explained with respect to a case where the color is converted from the RGB space of the display to the CMY space of the printer as an example. FIG. 2 shows the details of the RGB/CMY conversion coordinates space 104 of FIG. 1C. Color values of the RGB space serving as an input color and color values of the CMY space serving as an output color have values within a range of 0 to 255. In the RGB/CMY conversion coordinates space 104, for example, a lattice interval w is set to 32 (w=32), each of the input colors (R, G, B) serving as a converting source has representative input colors 0, 32, 64, 96, 128, 160, 192, 224, and 255, respectively. The representative output colors (C, M, Y) after completion of the conversion have been stored at positions of the lattice points which are decided by the representative input colors.

Specifically speaking, the CMY representative output colors are stored at the lattice points of the RGB space in accordance with the following arrangements.

$$C[r, g, b]$$

$$M[r, g, b]$$

$$Y[r, g, b]$$

where, r, g, and b denote lattice numbers indicative of a coordinates position in a lattice space serving as a cube surrounded by eight lattice points. Since the lattice space is called a data set, the lattice number is also called a data set number. Explanation will now be made on the assumption that the lattice space is the data set. The data set numbers indicative of a three-dimensional position of the lattice point where an arbitrary input color (R, G, B) is included are obtained by the following equations.

$$r=(\text{int})(R \div w)$$

$$g=(\text{int})(G \div w)$$

$$b=(\text{int})(B \div w) \quad (1)$$

where, w denotes the lattice interval and, for example, w=32. (int) means a formation of an integer by rounding-off. For instance, the data set numbers corresponding to the minimum value (0, 0, 0) of the input color (R, G, B) are set to r=0, g=0, and b=0. The data set numbers corresponding to an input color (32, 0, 0) are set to r=1, g=0, and b=0. Further, the data set numbers corresponding to an input color (32, 128, 128) are set to r=1, g=4, and b=4.

As shown in FIG. 3, in the cube interpolating method, interpolating arithmetic operations are performed by using eight lattice points A1 to A8 serving as vertices of a cube surrounding an interpolation point 110 of an input color (Rc, Gc, Bc). First, when coordinates positions shown by the data set numbers of the eight lattice points A1 to A8 surrounding the interpolation point 110 are shown by setting the lattice point A1 to a reference position and setting the other positions to relative positions for the reference position, the following coordinates values are obtained.

A1(r, g, b)

A2(r+1, g, b)

A3(r, g+1, b)

A4(r+1, g+1, b)

A5(r, g, b+1)

A6(r+1, g, b+1)

A7(r, g+1, b+1)

A8(r+1, g+1, b+1)

When output colors (C, M, Y) set in the lattice points A1 to A8 are expressed by arrangements of the lattice point coordinates, the following equations are obtained.

$C1=C[r, g, b]$ $C2=C[r+1, g, b]$ $C3=C[r, g+1, b]$ $C4=C[r+1, g+1, b]$ $C5=C[r, g, b+1]$ $C6=C[r+1, g, b+1]$ $C7=C[r, g+1, b+1]$ $C8=C[r+1, g+1, b+1]$ $M1=M[r, g, b]$ $M2=M[r+1, g, b]$ $M3=M[r, g+1, b]$ $M4=M[r+1, g+1, b]$ $M5=M[r, g, b+1]$ $M6=M[r+1, g, b+1]$ $M7=M[r, g+1, b+1]$ $M8=M[r+1, g+1, b+1]$ $Y1=Y[r, g, b]$ $Y2=Y[r+1, g, b]$ $Y3=Y[r, g+1, b]$ $Y4=Y[r+1, g+1, b]$ $Y5=Y[r, g, b+1]$ $Y6=Y[r+1, g, b+1]$ $Y7=Y[r, g+1, b+1]$ $Y8=Y[r+1, g+1, b+1]$

The output colors (C, M, Y) set in the lattice points A1 to A8 are shown as follows for simplicity of description.

A1(C1, M1, Y1)

A2(C2, M2, Y2)

A3(C3, M3, Y3)

A4(C4, M4, Y4)

A5(C5, M5, Y5)

A6(C6, M6, Y6)

A7(C7, M7, Y7)

A8(C8, M8, Y8)

A position (Rs, Gs, Bs) in the data set of the interpolation point 110 having an input color (Rc, Gc, Bc) is calculated by the following equations.

$Rs=(Rc)\%w$ $Gs=(Gc)\%w$ $Bs=(Bc)\%w$ (2)

where, % denotes a remainder of the division.

As shown in FIG. 4, volumes V1 to V8 of eight rectangular prisms obtained by dividing the cube in the lattice point space so as to include the lattice points A1 to A8 for the interpolation point 110 are calculated as linear conversion parameters to be used for the interpolation calculations.

$V8=(w-Rs)\times(w-Gs)\times(w-Bs)$ $V7=Rs\times(w-Gs)\times(w-Bs)$ $V6=(w-Rs)\times Gs\times(w-Bs)$ $V5=Rs\times Gs\times(w-Bs)$ $V4=(w-Rs)\times(w-Gs)\times Bs$ $V3=Rs\times(w-Gs)\times Bs$ $V2=(w-Rs)\times Gs\times Bs$ $V1=Rs\times Gs\times Bs$ (3)

Finally, an output color (Cx, Mx, Yx) at the interpolation point 110 is calculated by the interpolation calculation. In the interpolation calculation, the output colors (C1, M1, Y1) to (C8, M8, Y8) at the eight lattice points A1 to A8 are weighted by the linear conversion parameters V1 to V8 calculated by the equations (3), thereby averaging them. The output color is calculated by the following equations.

$Cx=\{C1\times V8+C2\times V7+C3\times V6+C4\times V5+C5\times V4+C6\times V3+C7\times V2+C8\times V1\}\div(w\times w\times w)$ $Mx=\{M1\times V8+M2\times V7+M3\times V6+M4\times V5+M5\times V4+M6\times V3+M7\times V2+M8\times V1\}\div(w\times w\times w)$ $Yx=\{Y1\times V8+Y2\times V7+Y3\times V6+Y4\times V5+Y5\times V4+Y6V3+Y7\times V2+Y8\times V1\}\div(w\times w\times w)$ (4)

In the conventional cube interpolating method, it is assumed that the output colors set at the eight lattice points in the lattice point space used to calculate the linear conversion parameters linearly change in a range from the maximum value to the minimum value. Therefore, all of the output colors at the eight lattice points forming the cube which surrounds the interpolation point are referred at the time of the interpolation calculation. However, in case of data in which the input color increases or decreases only in a single direction, for example, in case of having an achromatic gradation known as a gray axis, there is no unidirectional property in the output color obtained by the interpolation calculation depending on values of the output colors at the lattice points surrounding the interpolation point, so that there is a problem of occurrence of reversal to the directional property in the output color at the interpolation point.

FIG. 5 is an explanatory diagram in the case where the output color at the interpolation point calculated by interpolating is reversed for the axis of the achromatic gradation in which only the lightness changes from black and reaches white. An axis connecting the lattice points A1 and A8 in the data set is an achromatic gradation axis 120. In this instance, when an input color (Ri, Gi, Bi) at the interpolation point 110 located on the achromatic gradation axis 120 is equal to (16, 16, 16), a relative position (Rs, Gs, Bs) in the data set is equal to (16, 16, 16) according to the equations (2). When the conversion parameters V1 to V8 serving as volume ratios are calculated from the equations (3), $$V1 \text{ to } V8 = 16 \times 16 \times 16 = 4096$$

When the values of the linear conversion parameters V1 to V8 are substituted into the equations (4), the output color (Cx, Mx, Yx) at the interpolation point is as follows.

$$Cx = (23+27+30+39+4+24+50+0) \times 4096 \div 32768 = 25$$

$$Mx = (5+81+13+9+59+59+2+0) \times 4096 \div 32768 = 29$$

$$Yx = (24+29+115+30+111+27+0) \times 4096 \div 32768 = 48$$

Inherently, the relations $$(C1, M1, Y1) < (Cx, Mx, Yx) < (C8, M8, Y8)$$

have to be satisfied among the output colors at the lattice point A1, interpolation point X, and lattice point A8.

In the conventional cube interpolating method, however, since the conversion parameters V1 to V8 are formed by referring to the output colors of all of the lattice points A1 to A8, the output color at the interpolation point 110 is attracted to the output colors at the lattice points A2 to A7 which do not have the same directional property for the achromatic gradation axis 120 and exceed the output color at the lattice point A8, so that a reverse phenomenon occurs among the output colors at the lattice points A1 to A8. As for the problem of the reverse phenomenon of the output colors by the interpolation calculation on the achromatic gradation axis, for example, in JP-7-099,587, as shown in FIG. 6, an interpolation cube 140 adjacent to a unit cube 130 is defined, an oblique triangular prism 150 is set between them, the achromatic gradation axis 120 is allocated onto an edge line between lattice points (a and e) of the oblique triangular prism 150, and the achromatic interpolation is performed by referring to only the lattice points (a and e) serving as two end points of the edge line 150, thereby preventing the reverse phenomenon from occurring in the output color at the interpolation point locating on the edge line 150. According to the method, however, since gradations other than the achromatic color are not guaranteed, the problem remains. As a second problem in the conventional cube interpolating method, when the linear interpolation is used for the color conversion in a region having a high non-linearity like, for example, a γ curve, although desired output values are shown by a curve, actual output values are shown by a line obtained by connecting straight lines whose angles are slightly changed, so that a large conversion error occurs.

FIG. 7 shows a G-R plane of the multidimensional conversion coordinates space 104 in which the RGB input color is converted to the CMY output color. The plane shows parts of a data set 104-1 having boundaries shown by broken lines and neighboring data sets 104-2, 104-3, and 104-4. The input color changes as shown by A1 and A26 at the boundary of the data set 104-1. The output color is interpolated by a straight line 170-1 connecting the lattice points A1 and A26 in the data set 104-1. The output color at the lattice point A26 on the data set boundary is obtained by a straight line interpolation of the output colors at the lattice points A2 and A6. As compared with the change in output color interpolated by the straight line 170-1, an actual output color changes like a curve 180 as, for example, a γ curve and a large conversion error occurs between the actual output color and the output color interpolated by the straight line 170-1. Similarly in the next data set 104-2 as well, as compared with an output color interpolated by a straight line 170-2, a large conversion error occurs between the curve 180 as a change in inherent output color and the line 170-2.

SUMMARY OF THE INVENTION

According to the invention, there is provided a color converting method in which an inversion of an output color by the reference to the periphery at a position where the directional property of gradation has to be guaranteed is prevented.

According to the invention, there is provided a color converting method in which a conversion precision is improved by reducing a conversion error occurring in an interpolation of an output color having high non-linearity for a linear input color.

According to the invention, there is provided a color converting method based on a cube interpolating method, comprising a conversion table forming step, a linear conversion parameter calculating step, a non-linear conversion parameter forming step, a discriminating step, a linear interpolating step, and a non-linear converting step. Among them, the conversion table forming step, linear conversion parameter calculating step, and linear interpolating step are executed in the same procedure as that of an existing cube interpolating method. The non-linear conversion parameter forming step, discriminating step, and non-linear converting step which are peculiar to the invention are added to the above procedure.

In the conversion table forming step, a multi-dimensional conversion table in which an output color of a second color space corresponding to an input color of a first color space is stored at each lattice point in a multi-dimensional conversion coordinates space having a predetermined lattice interval (w) is formed. In the linear conversion parameter calculating step, linear conversion parameters V1 to V8 which are used in an interpolation calculation of an output color corresponding to an input color at a point other than the lattice points in the conversion coordinates space are calculated. In the non-linear conversion parameter calculating step, non-linear conversion parameters VV1 to VV8 which are used in the interpolation calculation of an output color corresponding to an input color at a point other than the lattice points in the conversion coordinates space are calculated. In the discriminating step, it is discriminated which ones of the linear conversion parameters and the non-linear conversion parameters are used each time the input color in the first color space is fetched. In the linear interpolating step, an output color at an interpolation point is interpolation calculated by using the linear conversion parameters discriminated in the discriminating step. In the non-linear interpolating step, the output color at the interpolation point is interpolation calculated by using the non-linear conversion parameters discriminated in the discriminating step. According to the color converting method of the invention as mentioned above, the interpolation calculation using the non-linear conversion parameters which guarantee gradation and have high precision and the interpolation calculation using the linear conversion parameters which can be processed at a high speed are provided as an interpolating process for converting the input color of the first color space into the output color of the second color space. The interpolation calculation using the non-linear conversion parameters with high precision is executed with respect to only a necessary region and the linear conversion parameters which can be processed at a high speed are calculated with respect to the rest region, thereby certainly preventing an inversion of the output color in a region including an achromatic gradation axis and performing the color conversion with high precision as a whole and whose performance is hardly influenced.

In the linear conversion parameter calculating step, with respect to a data set (unit lattice space) constructing the conversion coordinates space, it is regarded that an output color at each interpolation point changes from the minimum value to the maximum value which are given by output colors at the internal lattice points, and the linear conversion parameters V1 to V8 corresponding to data set positions at eight lattice points of a data set surrounding the interpolation point are calculated every interpolation point and held. That is, in the linear conversion parameter calculating step, the inside of the data set is divided into eight rectangular prisms so as to include peripheral eight lattice points around the interpolation point and volumes of the divided spaces are calculated as linear conversion parameters V1 to V8. In the linear conversion parameter forming step, when the data set is set to a cube having a lattice width of (w) and the first color space is set to an RGB space and a position (Rs, Gs, Bs) of the interpolation point in the data set corresponding to three input color components (Rc, Gc, Bc) is calculated as $Rs=(Rc)\%w$ $Gs=(Gc)\%w$ $Bs=(Bc)\%w$ where, % is a remainder, the linear conversion parameters V1 to V8 are calculated as follows.

$V1=Rs \times Gs \times Bs$ $V2=(w-Rs) \times Gs \times Bs$ $V3=Rs \times (w-Gs) \times Bs$ $V4=(w-Rs) \times (w-Gs) \times Bs$ $V5=Rs \times Gs \times (w-Bs)$ $V6=(w-Rs) \times Gs \times (w-Bs)$ $V7=Rs \times (w-Gs) \times (w-Bs)$ $V8=(w-Rs) \times (w-Gs) \times (w-Bs)$ In the linear conversion parameter calculating step, when the first color space is set to an L*a*b* space and a relative position (Ls, as, bs) of the interpolation point in the data set corresponding to three input color components (L*c, a*c, b*c) is calculated as $Ls=(L^*c)\%w$ $as=(a^*c)\%w$ $bs=(b^*c)\%w$ where, % is a remainder, the linear conversion parameters are calculated as follows.

$V1=Ls \times as \times bs$ $V2=(w-Ls) \times as \times bs$ $V3=Ls \times (w-as) \times bs$ $V4=(w-Ls) \times (w-as) \times bs$ $V5=Ls \times as \times (w-bs)$ $V6=(w-Ls) \times as \times (w-bs)$ $V7=Ls \times (w-as) \times (w-bs)$ $V8=(w-Ls) \times (w-as) \times (w-bs)$ The linear conversion parameters V1 to V8 are calculated according to an existing cube interpolating method.

In the non-linear conversion parameter forming step peculiar to the invention, with respect to a unit lattice space (data set) constructing a conversion coordinates space, it is regarded that an output color at each interpolation point linearly changes on a gradation guarantee line connecting two lattice points and the output color at each interpolation point non-linearly changes in a portion except for the above points. The non-linear conversion parameters VV1 to VV8 corresponding to eight lattice points surrounding the guarantee point are calculated in such a manner that as the interpolation point approaches the guarantee line, the ratio of referring to the lattice points at both ends of the guarantee line is increased and the ratio of referring to the lattice points other than the points out of the guarantee line is decreased. By using the non-linear conversion parameters which non-linearly change in accordance with a distance from the guarantee line which guarantees gradation and connects arbitrary colors positioning on a data set boundary as mentioned above, the color conversion such that the nearer to the guarantee point is, the more the ratio of referring to the point to be guaranteed increases and an influence on a point which is not guaranteed is suppressed can be executed, so that the problem that the output color at the interpolation point on the guarantee line is inverted can be solved.

It is now assumed that a distance between an intersecting point of a perpendicular from the interpolation point to a guarantee line connecting two lattice points A1 and A8 in the data set and the interpolation point is set to L1, a distance between a boundary point passing through a data set external boundary on the extended perpendicular and the interpolation point is set to L2, distances between the intersecting point of the guarantee line and the perpendicular and the lattice points A1 and A8 at both ends are set to B2 and B1, respectively, the sum of the distances is set to (B1+B2=B0), and the linear conversion parameters corresponding to the eight lattice points are set to V1 to V8. In this case, the non-linear conversion parameters VV1 to VV8 corresponding to the eight lattice points A1 to A8 are calculated by the following equations.

$$VV1 = \frac{\{(V1 \div www) \times L1\} + \{(B1 \div B0) \times L2\}}{(L1+L2)} \times www$$

$$VV2 = \frac{\{(V2 \div www) \times L1\}}{(L1+L2)} \times www$$

$$VV3 = \frac{\{(V3 \div www) \times L1\}}{(L1+L2)} \times www$$

$$VV4 = \frac{\{(V4 \div www) \times L1\}}{(L1+L2)} \times www$$

$$VV5 = \frac{\{(V5 \div www) \times L1\}}{(L1+L2)} \times www$$

$$VV6 = \frac{\{(V6 \div www) \times L1\}}{(L1+L2)} \times www$$

$$VV7 = \frac{\{(V7 \div www) \times L1\}}{(L1+L2)} \times www$$

$$VV8 = \frac{\{(V8 \div www) \times L1\} + \{(B2 \div B0) \times L2\}}{(L1+L2)} \times www$$

In the second parameter forming step, when the interpolation point exists on the guarantee line connecting the two lattice points A1 and A8 in the data set, the distance L1 between the interpolation point of the right side of the calculation equation of each of the non-linear conversion parameters VV1 to VV8 and the intersecting point of the guarantee line and the perpendicular is set to (L1=0). Thus, the non-linear conversion parameters VV1 to VVB corresponding to the eight lattice points A1 to A8 are calculated as follows.

$$VV1=(w \times w \times w) \times (B1/B0)$$

$$VV2=0$$

$$VV3=0$$

$$VV4=0$$

$$VV5=0$$

$$VV6=0$$

$$VV7=0$$

$$VV8=(w \times w \times w) \times (B2/B0)$$

In the discriminating step, whether the data set to which the input color in the first color space belongs includes the guarantee line of the achromatic gradation or not is discriminated. When it is determined that the data set includes the guarantee line, the interpolation calculation using the non-linear conversion parameters VV1 to VV8 is selected. When it is decided that the guarantee line is not included, the interpolation calculation using the linear conversion parameters VV1 to VV8 is selected.

In the discriminating step, when the first color space is an RGB space, a position (r, g, b) in the data set to which the input color (R, G, B) belongs is calculated by using the lattice width (w) as follows.

$$r=(int)R \div w$$

$$g=(int)G \div w$$

$$b=(int)B \div w$$

where, (int) denotes formation of an integer by rounding off.

When r=g=b is satisfied, it is determined that the data set includes the guarantee line and the interpolation calculation using the non-linear conversion parameters VV1 to VV8 is selected.

When r=g=b is not satisfied, it is decided that the data set does not include the guarantee line, and the interpolation calculation using the linear conversion parameters V1 to V8 is selected. In the discriminating step, a preliminarily designated result is discriminated and either the interpolation calculation using the linear conversion parameters V1 to V8 or the interpolation calculation using the non-linear conversion parameters VV1 to VV8 is selected. For example, the user designates in accordance with the kind of an image to be color converted by a user interface. In this case, when an image is a natural image such as a photograph or the like whose gradation does not have to be guaranteed, the use of the linear conversion parameters V1 to V8 is designated. When the image is a graph, a business document, a CG image, or the like whose gradation has to be guaranteed, the use of the non-linear conversion parameters VV1 to VV8 is designated. By executing the non-linear interpolation calculation with high precision only to a region in which the gradation has to be guaranteed and by executing the linear interpolation calculation which can be processed at a high speed to the rest of the region, a color conversion with high precision as a whole and whose performance is hardly influenced can be performed.

In the linear interpolation calculating step, output colors at eight lattice points in the lattice space to which the interpolation point belongs are weighted by the linear conversion parameters corresponding to the position of the interpolation point in the unit lattice space and a mean of the weighted output colors is calculated as an output color at the interpolation point. In the linear interpolation calculating step, the invention is characterized in that when predetermined non-linear characteristics, for example, γ characteristics are set into the output color by using a multi-dimensional conversion table in which an input color and an output color have been set in accordance with a linear relation, after a re-calculation for converting the input color at the interpolation point to a position based on the non-linear characteristics was performed, the output color at the re-calculated interpolation point is calculated by the linear interpolation calculation. As for the re-calculation at the interpolation point in the linear interpolation calculating step, the input color (Rc, Gc, Bc) at the interpolation point is divided by the maximum color value 255 and is converted into a position (Rn, Gn, Bn) in a data set normalized to, for example, 0 to 1, and after that, the conversion calculation of the non-linear characteristics is executed. An input color at the interpolation point according to the non-linear characteristics is re-calculated by multiplying the converted calculation value by the maximum color value 255, and an output color corresponding to the re-calculated input color at the interpolation point is calculated by the linear interpolation. By the re-calculation of the input color at the interpolation point according to the non-linear characteristics of the output color, the position of the interpolation point is corrected from a position on the interpolation straight line to a position on a curve which gives the non-linear characteristics of the output color. Even if there are strong non-linear characteristics of the output color, an interpolation result having a small conversion error is obtained.

In the linear interpolation calculating step, for example, in the case where the second space is the CMY space, the output colors at the eight lattice points A1 to A8 in the lattice space to which the interpolation point belongs are set to (C1, M1, Y1) to (C8, M8, Y8) and the linear conversion parameters corresponding to the position of the interpolation point are set to V1 to V8, an output color (Cx, Mx, Yx) at the interpolation point is calculated as follows.

$$Cx=\{C1 \times V8+C2 \times V7+C3 \times V6+C4 \times V5+C5 \times V4+C6 \times V3+C7 \times V2+C8 \times V1\} \div (w \times w \times w)$$

$$Mx=\{M1 \times V8+M2 \times V7+M3 \times V6+M4 \times V5+M5 \times V4+M6 \times V3+M7 \times V2+M8 \times V1\} \div (w \times w \times w)$$

$$Yx=\{Y1 \times V8+Y2 \times V7+Y3 \times V6+Y4 \times V5+Y5 \times V4+Y6 \times V3+Y7 \times V2+Y8 \times V1\} \div (w \times w \times w)$$

This calculating method is based on the existing cube interpolating method.

In the linear interpolation calculating step, in the case where the second space is the L*a*b* space, when the output colors at the eight lattice points A1 to A8 in the lattice space to which the interpolation point belongs are set to (L*1, a*1, b*1) to (L*8, a*8, b*8) and the linear conversion parameters are set to V1 to V8, an output color (L*x, a*x, b*x) at the interpolation point is calculated as follows.

$$L*x=\{L*1 \times V8+L*2 \times V7+L*3 \times V6+L*4 \times V5+L*5 \times V4+L*6 \times V3+L*7 \times V2+L*8 \times V1\} \div (w \times w \times w)$$

$$a*x=\{a*1 \times V8+a*2 \times V7+a*3 \times V6+a*4 \times V5+a5 \times V4+a*6 \times V3+a*7 \times V2+a*8 \times V1\}(w \times w \times w)$$

$$b*x=\{b*1 \times V8+b*2 \times V7+b*3 \times V6+b*4 \times V5+b*5 \times V4+b*6 \times V3+b*7 \times V2+b*8 \times V1\} \div (w \times w \times w)$$

In the non-linear interpolation calculating step peculiar to the invention, the output colors at the eight lattice points in the lattice space to which the interpolation point belongs are weighted by the non-linear conversion parameters at the lattice points and a mean of the weighted out colors is calculated as an output color at the interpolation point.

In the non-linear interpolation calculating step, in the case where the second space is the CMY space, when the output colors at the eight lattice points A1 to A8 in the lattice space to which the interpolation point belongs are set to (C1, M1, Y1) to (C8, M8, Y8) and the non-linear conversion parameters are set to VV1 to VV8, an output color (Cx, Mx, Yx) at the interpolation point is calculated as follows.

$$Cx=\{C1 \times VV8+C2 \times VV7+C3 \times VV6+C4 \times VV5+C5 \times VV4+C6 \times VV3+C7 \times VV2+C8 \times VV1\} \div (w \times w \times w)$$

$$Mx=\{M1 \times VV8+M2 \times VV7+M3 \times VV6+M4 \times VV5+M5 \times VV4+M6 \times VV3+M7 \times VV2+M8 \times VV1\} \div (w \times w \times w)$$

$$Yx=\{Y1 \times VV8+Y2 \times VV7+Y3 \times VV6+Y4 \times VV5+Y5 \times VV4+Y6 \times VV3+Y7 \times VV2+Y8 \times VV1\} \div (w \times w \times w)$$

In the non-linear interpolation calculating step, in the case where the second space is the L*a*b* space, when the output colors at the eight lattice points A1 to A8 in the lattice space to which the interpolation point belongs are set to (L*1, a*1, b*1) to (L*8, a*8, b*8) and the linear conversion parameters are set to VV1 to VV8, the output color (L*x, a*x, b*x) at the interpolation point is calculated as follows.

$$L*x=\{L*1 \times VV8+L*2 \times VV7+L*3 \times VV6+L*4 \times VV5+L*5 \times VV4+L*6 \times VV3+L*7 \times VV2+L*8 \times VV1\} \div (w \times w \times w)$$

$$a*x=\{a*1 \times VV8+a*2 \times VV7+a*3 \times vv6+a*4 \times VV5+a*5 \times VV4+a*6 \times VV3+a*7 \times VV2+a*8 \times VV1\} \div (w \times w \times w)$$

$$b*x=\{b*1 \times VV8+b*2 \times VV7+b*3 \times VV6+b*4 \times VV5+b*5 \times VV4+b*6 \times VV3+b*7 \times VV2+b*8 \times VV1\} \div (w \times w \times w)$$

According to such linear interpolation calculating step and the non-linear interpolation calculating step, even if the output color at the interpolation point is determined by using the non-linear conversion parameters in the data set neighboring to the data set in which the output color at the interpolation point has been determined by using the linear conversion parameters, although the output color changes non-linearly in the data set, the output color changes linearly as the interpolation point approaches a boundary region. Thus, even if the data set using the linear conversion parameters and the data set using the non-linear conversion parameters mixedly exist, an almost same output color can be determined by the interpolation calculation in the boundary region of the data sets, so that the continuity of the output colors in the boundary region of the lattice space can be guaranteed. In the interpolation calculation using the non-linear conversion parameters, to determine the output color at the interpolation point on the gradation guarantee line connecting two lattice points in the lattice space, by setting the non-linear conversion parameter which refers to the output color in the boundary region with the neighboring lattice space to zero, a lattice point which is not referred to is caused, inversion or deviation of an output color by referring to the peripheral points is certainly prevented, and the directional property of the gradation is guaranteed.

The above and other objects, features, and advantages of the present invention will become more apparent from the following detailed description with reference to the drawings.

BRIEF DESCRIPTION OF THE DRAWINGS

FIG. 2 is an explanatory diagram of a conversion coordinates space to convert an RGB input color into a CMY output color;

FIGS. 13A and 13B are flowcharts for a non-linear conversion parameter calculating process in FIG. 11;

DETAILED DESCRIPTION OF THE PREFERRED EMBODIMENT

Figure 8:
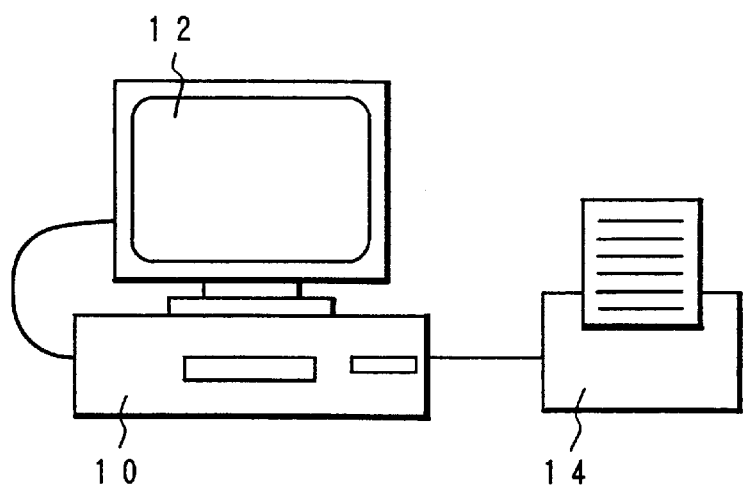
FIG. 8 is an explanatory diagram of a computer apparatus to which the invention is applied.

FIG. 8 shows a general personal computer and its peripheral equipment to which a color converting method of the invention is applied. A color display 12 as an image display apparatus and a color printer 14 as an image printing apparatus are connected to a personal computer 10. The personal computer 10 stores color image data constructed by values of a colorimetric system such as RGB or CMY into a storing device such as an internal hard disk drive or the like. The personal computer 10 sends RGB values of each pixel of a color image constructed by values of the RGB colorimetric system as a display drive signal to the color display 12, thereby allowing the color display 12 to display a color image. A printer control signal is formed from CMY values of each pixel of a color image constructed by values of the CMY colorimetric system and is sent to the color printer 14, thereby allowing the color printer 14 to print a color image. In order to convert the RGB color image data in the personal computer 10 into the CMY color image data and to print the image by the color printer, the color converting method of the invention is used.

Figure 9:
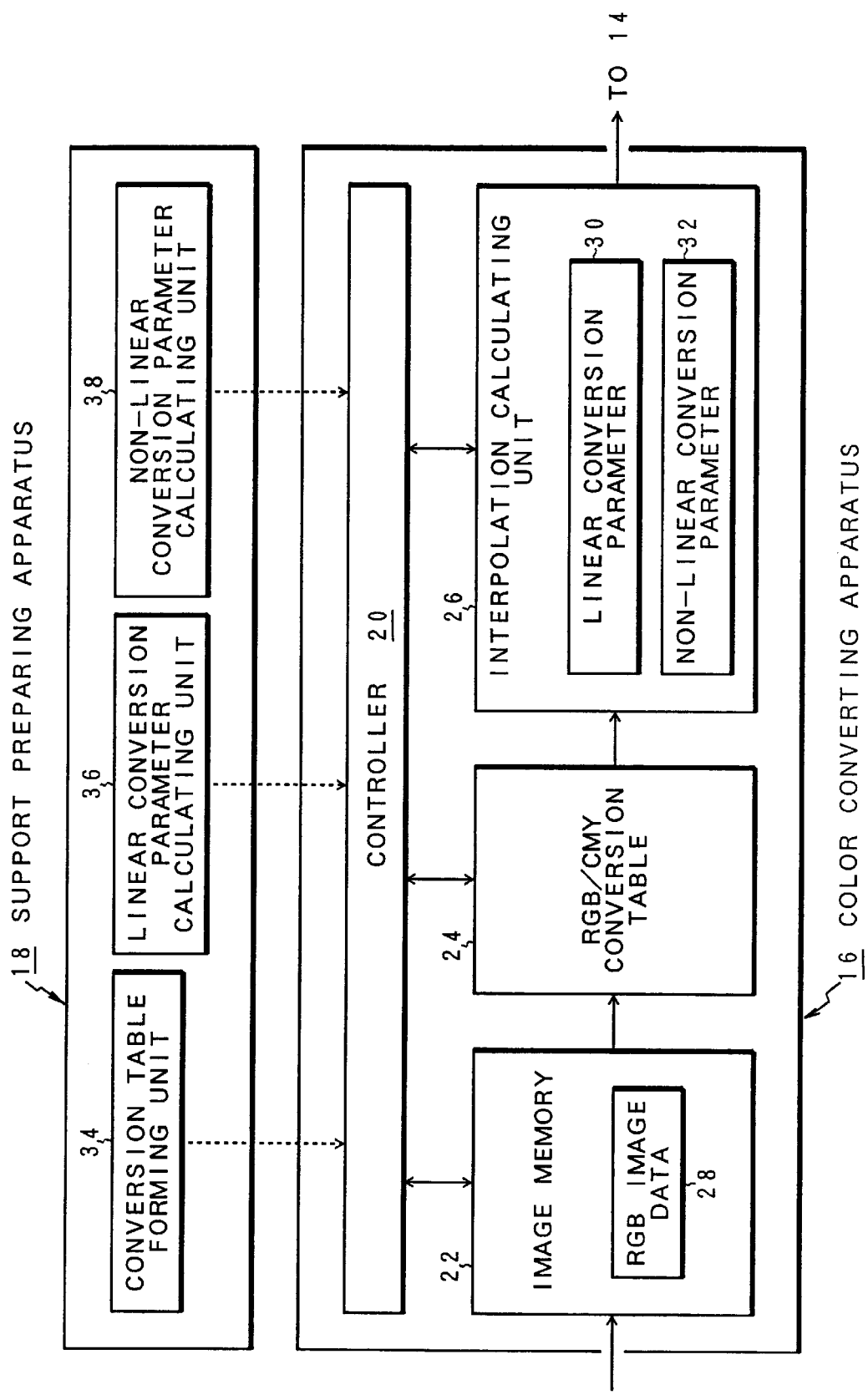
FIG. 9 is a functional block diagram to realize a color conversion according to the invention.

FIG. 9 is a functional block diagram of an apparatus construction by which the color converting method of the invention is realized. The color converting method of the invention is realized by a color converting apparatus 16 and a support preparing apparatus 18. The color converting apparatus 16 is realized as a function of a color conversion program of the personal computer 10 in FIG. 8. The support preparing apparatus 18 is an apparatus for forming table conversion parameters necessary for the color converting apparatus 16 as a preparing step and is used at a manufacturing stage of a providing source of the color converting apparatus. The color converting apparatus 16 comprises a controller 20, an image memory 22, an RGB/CMY conversion table 24, and an interpolation calculating unit 26. RGB image data 28 using color values of an RGB space (first color space) as a converting source has been stored in the image memory 22. The interpolation calculating unit 26 has a linear conversion parameter storing unit 30 and a non-linear conversion parameter storing unit 32 for storing conversion parameters which are used for the interpolation calculation when input RGB values are converted to output CMY values. The support preparing apparatus 18 comprises a conversion table forming unit 34, a linear conversion parameter forming unit 36, and a non-linear conversion parameter forming unit 38. An interpolation algorithm which is used by the interpolation calculating unit 26 in the color converting apparatus 16 adopts a cube interpolating method of executing an interpolation calculation by obtaining linear conversion parameters by using lattice points of eight vertices of a cube constructing a data set as a lattice space of an RGB/CMY conversion coordinates space in which an interpolation point shown by the input RGB values is included.

Figure 10:
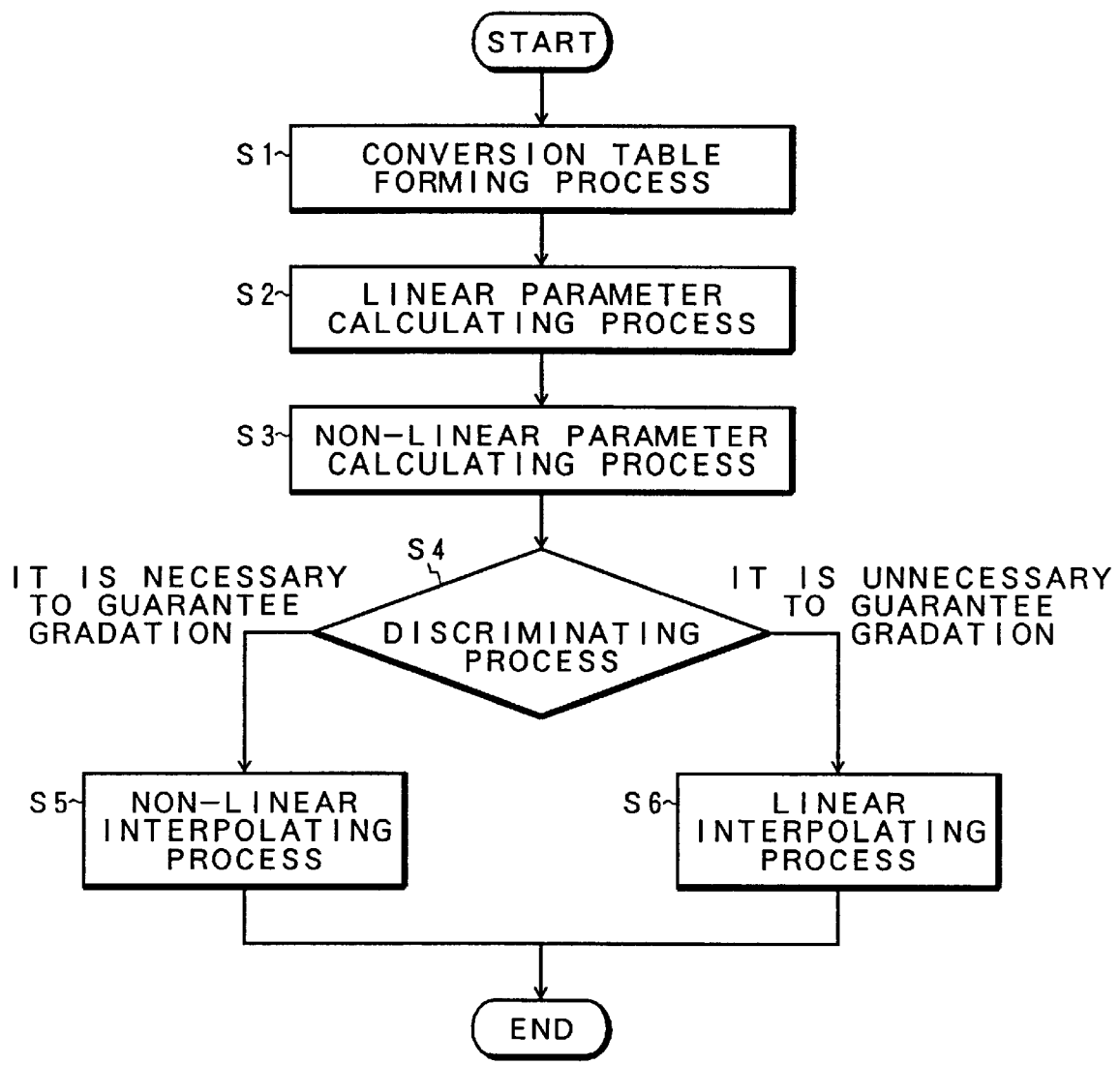
FIG. 10 is a flowchart for a fundamental procedure of a color converting method according to the invention.

FIG. 10 is a flowchart for a basic processing procedure of the color converting method of the invention which is realized by the support preparing apparatus 18 and color converting apparatus 16 in FIG. 9. The color converting method of the invention comprises a conversion table forming process in step S1, a linear conversion parameter calculating process in step S2, a non-linear conversion parameter calculating process in step S3, a discriminating process in step S4, a non-linear interpolating process in step S5, and a linear interpolating process in step S6. In the conversion table forming process in step S1, as shown in FIG. 2, the RGB/CMY conversion table 24 in which the output CMY values in the CMY space as a second color space corresponding to the input RGB values in the RGB space as a first color space have been stored at lattice points in a multidimensional RGB/CMY conversion coordinates space 104 having a predetermined lattice interval (w) is formed. In the RGB/CMY conversion table 24, a lattice point in the space is designated by three input values of R, G, and B values of each pixel in the RGB image data 28 and the CMY values preliminarily stored at the designated lattice point are read out, thereby converting the input RGB values into output CMY values. In the case where the input RGB values do not correspond to coordinate values of the lattice point which is determined by the lattice interval (w) in this instance, the output CMY values corresponding to the input RGB values are calculated by the interpolation calculation by the interpolation calculating unit 26.

In the linear conversion parameter calculating process in step S2 in FIG. 10, linear conversion parameters V1 to V8 which are used for the interpolation calculation of the output CMY values corresponding to the input RGB values other than the lattice points in the RGB/CMY conversion coordinates space are calculated. The linear conversion parameters V1 to V8 are calculated as same parameters as those by the existing cube interpolating method. In the non-linear conversion parameter calculating process in the next step S3, non-linear conversion parameters VV1 to VV8 which are used for the interpolation calculation of the output CMY values corresponding to the input RGB values other than the lattice points of the RGB/CMY conversion coordinates space are calculated. According to a data set as a lattice space for calculating the non-linear conversion parameters VV1 to VV8 is, for example, with respect to a data set through which an axial line for guaranteeing achromatic gradation in which only brightness changes from black to white passes in the RGB/CMY conversion coordinates space 104 of FIG. 2, the parameters for executing the interpolation calculation so that the output CMY values calculated with respect to the interpolation point on the achromatic gradation guarantee line do not have the values which are inverted or deviated for the directional property of the gradation are calculated. The non-linear conversion parameters VV1 to VV8 which are used for the data set through which a proper gradation guarantee line passes are calculated as parameters corresponding to eight lattice points surrounding a guarantee point so as to increase a ratio at which the lattice points at both ends of the guarantee line are referred and decrease a ratio at which the lattice points out of the guarantee line are referred as the interpolation point approaches the guarantee line. In the discriminating process in step S4, whether the linear conversion parameters obtained in step S2 or the non-linear conversion parameters obtained in step S3 are used for the interpolation calculation in the data set to which the input RGB values belong is discriminated each time the input RGB values of a pixel unit are fetched from the RGB image data. In the case where the use of the non-linear conversion parameters is determined in the discriminating step S4, in step S5, the non-linear conversion parameters VV1 to VV8 corresponding to the position that is determined by the input RGB values in the data set are used, the output CMY values at the peripheral eight lattice points in the data set to which the interpolation point as an interpolation arithmetic operation in the cube interpolating method belongs are weighted by the non-linear conversion parameters VV1 to VV8 corresponding to the position of the interpolation point in the data set, and a means of the weighted output CMY values is calculated. In the case where the use of the linear conversion parameters is decided in step S4, similarly, in accordance with the interpolation calculation in the cube interpolating method, the output CMY values at the eight lattice points in the data set to which the interpolation point belongs are weighted by the linear conversion parameters V1 to V8 read out in correspondence to the position of the interpolation point in the data set, and a mean of the weighted output CMY values is calculated in step S6. In the discriminating step S4, whether the non-linear conversion parameters are used or the linear conversion parameters are used is determined by, for example, discriminating whether the achromatic gradation guarantee line passes through the data set to which the RGB values as an interpolation target belong, that is, whether the gradation guarantee is necessary or not. That is, when the gradation guarantee is necessary, the interpolation calculation using the non-linear conversion parameters is executed in step S5. When it is unnecessary to guarantee the gradation, the interpolation calculation using the linear conversion parameters is executed in step S6. In the discriminating process in step S4, whether the linear conversion parameters are used or the non-linear conversion parameters are used can be also discriminated on the basis of the contents designated by the user by a user interface besides the discrimination about the presence or absence of the necessity of guaranteeing the gradation. As a discriminating method by the user, with respect to image data of, for example, a photograph or the like having a little necessity of guaranteeing the gradation, the interpolation calculation using the linear conversion parameters is designated. On the other hand, for the color conversion of image data such as a graph, business sentence, CG image, or the like which is artificially formed and whose gradation needs to be guaranteed, the interpolation calculation by the non-linear conversion parameters is designated.

Figure 11:
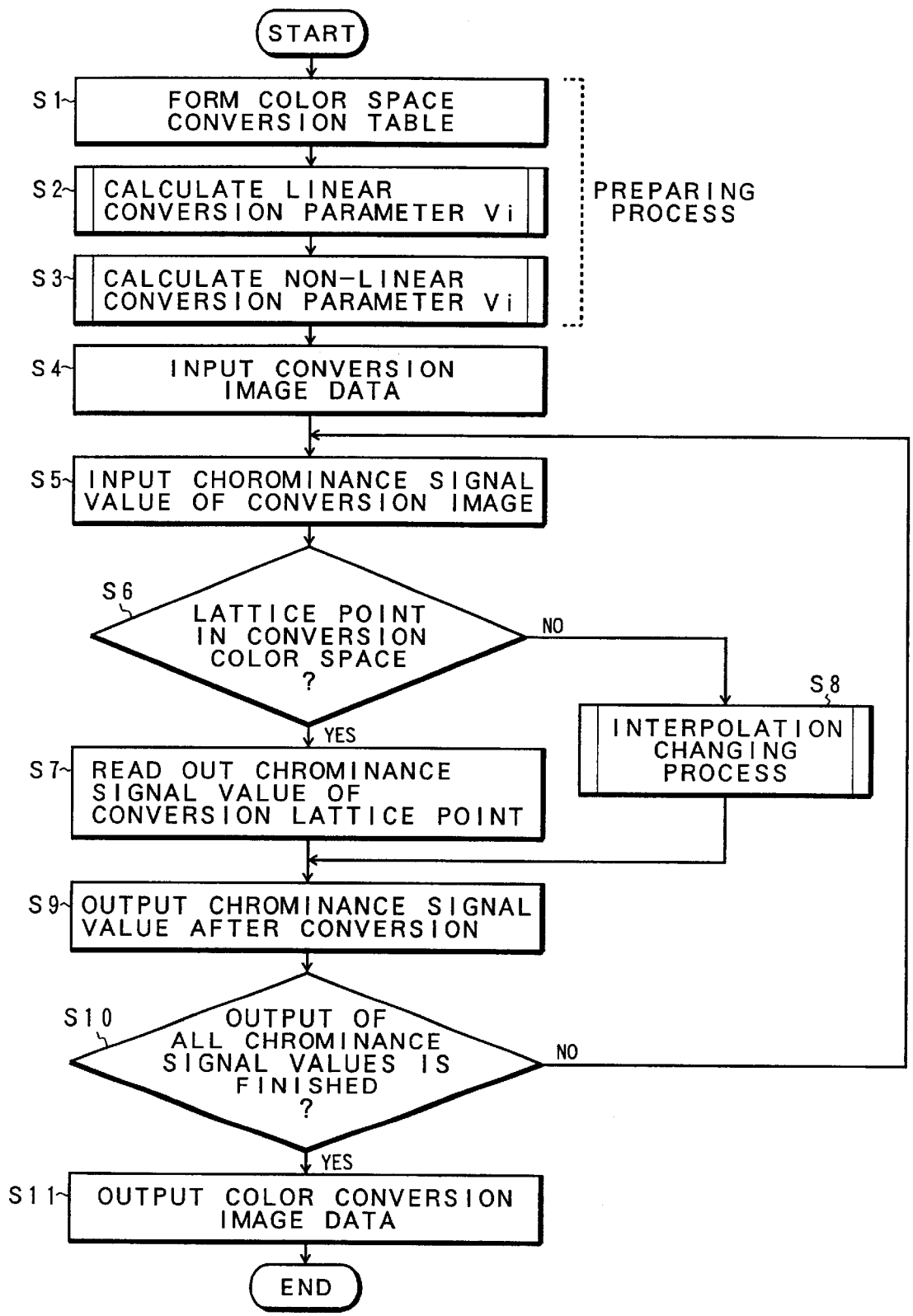
FIG. 11 is a flowchart for a color converting process according to the invention.

FIG. 11 is a flowchart of a color converting process according to the invention in which the basic processing procedure of FIG. 10 is shown further specifically. First in step S1, a color space conversion table, that is, the RGB/CMY conversion table 24 in FIG. 9 is formed.

The color space conversion table is formed as a preparing process comprising the steps of I) formation of an RGB/Lab conversion table, II) formation of an Lab/CMY conversion table, and III) formation of an RGB/CMY conversion table by combining the RGB/Lab conversion table and the Lab/CMY conversion table.

First, the RGB/Lab conversion table is formed in a manner such that a drive signal corresponding to the RGB values is sent to the color display 12 by using the RGB image data stored in the personal computer 10, a displayed color is measured by a measuring instrument, and L*, a*, and b* values are obtained. Subsequently, a printer control signal corresponding to the CMY values of the CMY image data stored in the personal computer 10 is sent to the color printer 14, the L*, a*, and b* values are obtained by measuring a color printed by the color printer 14 by a measuring instrument, and the Lab/CMY conversion table is formed on the basis of them. Finally, the RGB/Lab conversion table and the Lab/CMY conversion table are combined with the Lab values as intermediate values and the Lab values are omitted after the combination, thereby forming the RGB/CMY conversion table 24. The RGB/CMY conversion table 24 is stored in the color converting apparatus 16 as shown in FIG. 9. Subsequently, a linear conversion parameter V1 is calculated in step S2 in FIG. 11.

Figure 12:
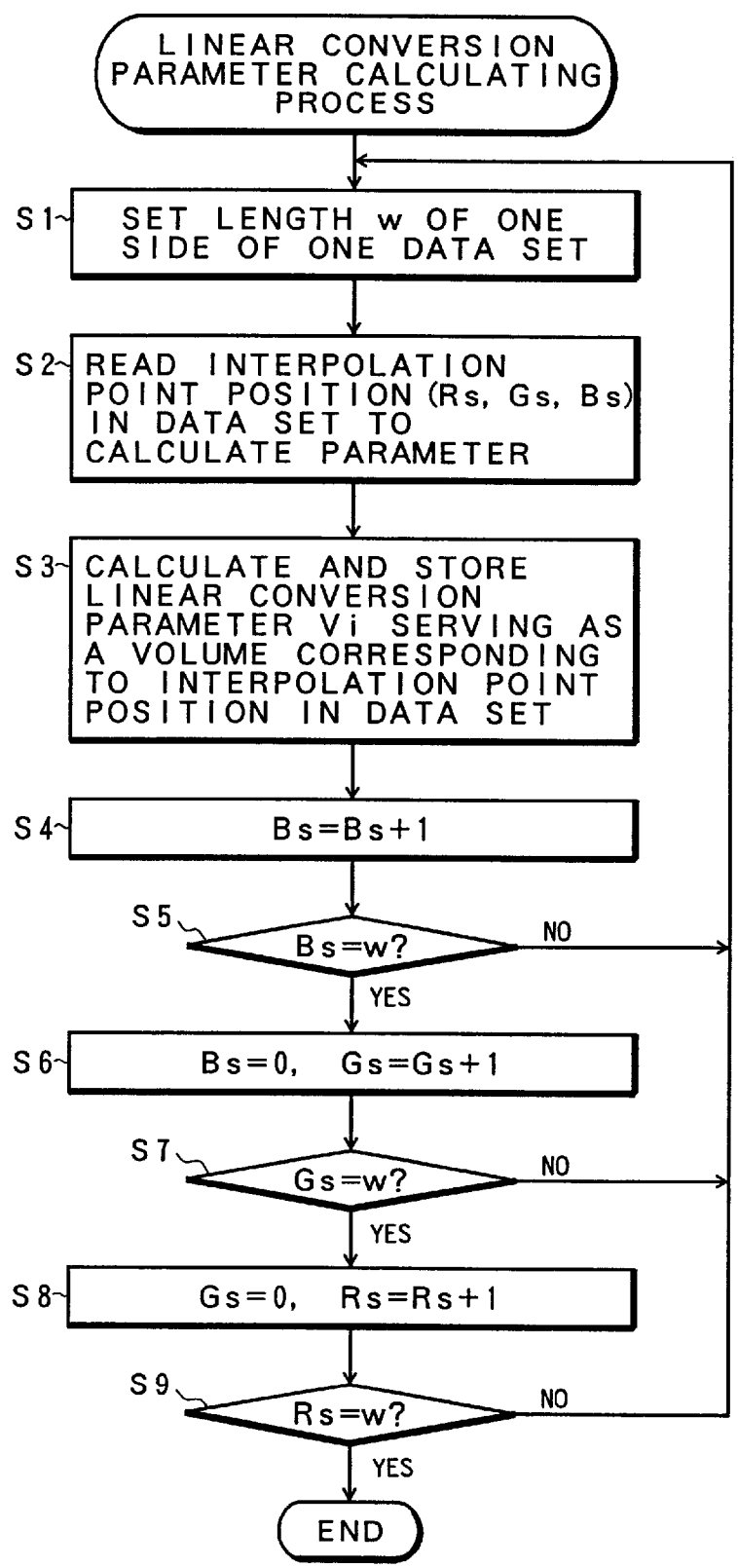
FIG. 12 is a flowchart for a linear conversion parameter calculating process in FIG. 11.

FIG. 12 is a flowchart for the linear conversion parameter calculating process in step S2 in FIG. 11. First in step S1, the lattice interval (w) as a length of one side of the unit data set is set. For example, as shown in FIG. 2, when the lattice interval (w) is set to 32 (w=32), data set numbers giving the lattice point intervals of the RGB/CMY conversion coordinates space are set to 0, 1, 2, 3, 4, 5, 6, and 7 for 0 to 255 of each of the R, G, and B values. In step S2, an interpolation point position (Rs, Gs, Bs) in the data set for calculating the linear conversion parameter is read by using a unit data set constructing a cube whose one side has a length (w) as a target. An initial value of the interpolation point position is equal to (0, 0, 0) and the maximum value is equal to (32, 32, 32) which correspond to the lattice width (w). In step S3, the space is divided into rectangular prisms every lattice points A1 to A8 as eight vertices in correspondence with the interpolation point position in the data set and the linear conversion parameters Vi (where, i=1 to 8) are calculated as a volume of each rectangular prism and are stored. Specifically, the linear conversion parameters V1 to V8 are calculated by the following equations.

$$V8=(w-Rs)-(w-Gs)-(w-Bs)$$

$$V7=Rs \times (w-Gs) \times (w-Bs)$$

$$V6=(w-Rs) \times Gs \times (w-Bs)$$

$$V5=Rs \times Gs \times (w-Bs)$$

$$V4=(w-Rs) \times (w-Gs) \times Bs$$

$$V3=Rs \times (w-Gs) \times Bs$$

$$V2=(w-Rs) \times Gs \times Bs$$

$$V1=Rs \times Gs \times Bs \qquad (5)$$

In step S4, "1" is added to the Bs value in the data set. In step S5, whether the Bs value has reached the maximum value (w) or not is checked. The processes in steps S1 to S4 are repeated until the Bs value reaches the maximum value (w). When the calculation of the linear conversion parameters V1 to V8 with respect to the Bs values of 0 to 32 is finished by the processes in steps S1 to S5, Bs is set to 0 (Bs=0) and, after that, "1" is added to Gs in step S6. The processes in steps S1 to S6 are repeated until the Gs value reaches the maximum value (w=32) in step S7. When the processes of (Gs=0 to 32) are finished in such a manner, the Gs value is set to 0 and, after that, "1" is added to the Rs value in step S8. The processes in steps S1 to S8 are repeated until the Rs value reaches to the maximum value (w=32) in step S9. By the processes in steps S1 to S9, the linear conversion parameters V1 to V8 corresponding to all of the interpolation point positions locating in the unit data set are calculated and stored. Since the lattice width (w) is equal to 32, the number of combinations of the linear conversion parameters V1 to V8 calculated with respect to the unit data set in this case is equal to $32^3$ (=32,768). Referring again to FIG. 11, when the calculation of the linear conversion parameters Vi is finished in step S2, the processing routine advances to step S3 and the non-linear conversion parameters VVi are calculated.

FIGS. 13A and 13B are a flowchart for the non-linear conversion parameter calculating process in step S3 in FIG. 11. In a manner similar to the calculation of the linear conversion parameter calculating process of FIG. 12, the non-linear conversion parameter calculating process is performed by calculating and storing the non-linear conversion parameters with respect to all of the interpolation point positions locating in the unit data set as a cube whose one side has the lattice width (w). In FIGS. 13A and 13B, the lattice interval (w) as a length of one side of one data set as a calculation target of the non-linear conversion parameters is set to, for example, (w=32) in step S1. In step S2, an interpolation point position (Rs, Gs, Bs) in the data set for calculating the parameters is read. An initial value of the interpolation point position is equal to (0, 0, 0). In step S3, the linear conversion parameters V1 to V8 which have already been calculated and correspond to the interpolation point position (Rs, Gs, Bs) at that time are read. In step S4, whether the interpolation point position whose non-linear conversion parameters are being calculated at present is on a straight line which passes through a region in the data set and on which the gradation is desired to be guaranteed or not is checked. When the interpolation point is on the straight line on which the gradation is desired to be guaranteed, processes in steps S5 and S6 are performed. On the other hand, when the interpolation point is not on the straight line on which the gradation is desired to be guaranteed, processes in steps S7, S8, and S9 are performed.

Figure 14:
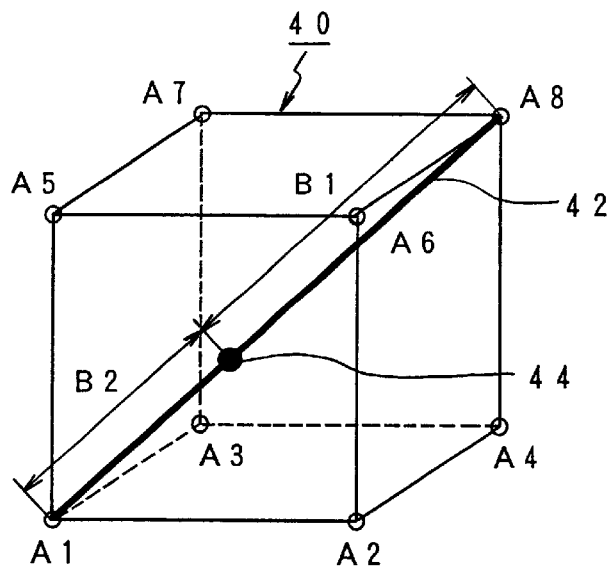
FIG. 14 is an explanatory diagram of a calculating principle of non-linear conversion parameters in the case where there is an interpolation point on a gradation guarantee line of a data set.

FIG. 14 is a diagram for explaining a principle of the non-linear conversion parameter calculating process which is executed in steps S5 and S6 in FIGS. 13A and 13B when the interpolation point is on the straight line on which the gradation is desired to be guaranteed. A unit data set 40 as a calculation target of the non-linear conversion parameters is constructed by a cube whose one side has the lattice point interval (w=32). With respect to the eight lattice points A1 to A8 as vertices of the cube, for example, a straight line connecting the lattice points A1 and A8 is used as an achromatic gradation guarantee line 42. When the input RGB values at an arbitrary lattice point in the actual RGB/CMY coordinates conversion space are set to (R, G, B), each of the input R, G, and B values is divided by the lattice point interval (w), thereby rounding to the nearest integer, so that the input R, G, and B values can be replaced to each of the lattice points A1 to A8 of the unit data set 40. The conversion from the input R, G, and B values to the coordinates values according to the data set is executed by the following equations.

$$r=(\text{int})(R \div w)$$
$$g=(\text{int})(G \div w)$$
$$b=(\text{int})(B \div w) \qquad (6)$$

Thus, the positions by the data set numbers of the lattice points A1 to A8 in the unit data set 40 in FIG. 14 are obtained as follows.

$$A1(r, g, b)$$
$$A2(r+1, g, b)$$
$$A3(r, g+1, b)$$
$$A4(r+1, g+1, b)$$
$$A5(r, g, b+1)$$
$$A6(r+1, g, b+1)$$
$$A7(r, g+1, b+1)$$
$$A8(r+1, g+1, b+1)$$

As mentioned above, at the lattice points A1 to A8 where the positions in the data set 40 are defined, the lattice point A1 at one end of the achromatic gradation guarantee line 42 shows an achromatic color when r=g=b and the lattice point A8 at the other end shows an achromatic color when r+1=g+1=b+1. There is the relation $$A1(C1, M1, Y1) < A8(C8, M8, Y8)$$

between the output values (C1, M1, Y1) set in the lattice point A1 and the output values (C8, M8, Y8) set in the lattice point A8. That is, the output CMY values at the lattice point A1 become the minimum, the output CMY values at the lattice point A8 become the maximum, and the output CMY values linearly change at the interpolation point between them.

The non-linear conversion parameters VV1 to VV8 at an interpolation point 44 on the achromatic gradation guarantee line 42 in FIG. 14 are calculated by the following equations with reference to only the lattice points A1 and A8 at both ends of the achromatic gradation guarantee line 42 without referring to the lattice points A2 to A7 out of the guarantee line.

$$VV1=(w \times w \times w) \times (B1/B0)$$
$$VV2=0$$
$$VV3=0$$
$$VV4=0$$
$$VV5=0$$
$$VV6=0$$
$$VV7=0$$
$$VV8=(w \times w \times w) \times (B2/B0) \qquad (7)$$

That is, for the interpolation point 44 on the achromatic gradation guarantee line 42, a distance B1 from the lattice point A8 and a distance B2 from the lattice point A1 are obtained. A volume (w×w×w) of the unit data set 40 is divided at a ratio of the lengths B1 and B2 from the lattice points A1 and A8 to the interpolation point 44 for a whole length B0=B1+B2 of the guarantee line 42, thereby calculating the non-linear conversion parameters VV1 and VV8. With respect to the non-linear conversion parameters VV2 to VV7 corresponding to the other lattice points A2 to A7 out of the achromatic gradation guarantee line 42, by setting all of them to "0", they are not referred in the interpolation calculation. In the calculating process of the non-linear conversion parameters with respect to the interpolation point 44 on the achromatic gradation guarantee line 42 in FIG. 14, the distances B1 and B2 between the lattice points as two end points of the guarantee line and the interpolation point are first calculated as shown in step S5 in FIGS. 13A and 13B. Subsequently, in step S6, the non-linear conversion parameters VV1 to VV8 are calculated in accordance with the equations (7) and are stored.

Figure 15:
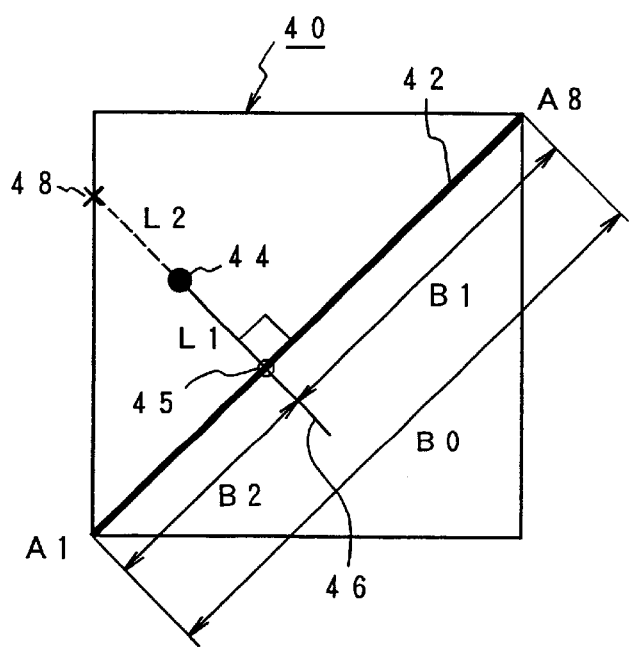
FIG. 15 is an explanatory diagram of a calculating principle of non-linear conversion parameters in the case where there is an interpolation point at a position out of the gradation guarantee line of the data set.

FIG. 15 shows a principle of the non-linear conversion parameter calculating process when the interpolation point does not exist on the straight line where the gradation is desired to be guaranteed in steps S7 to S9 in FIGS. 13A and 13B. In the unit data set 40, it is assumed that the interpolation point 44 exists at a position out of the achromatic gradation guarantee line 42 connecting the lattice points A1 and A8 in the data set. In this case, a perpendicular 46 which passes through the interpolation point 44 and reaches onto the achromatic gradation guarantee line 42 is set. With respect to an intersecting point 45 of the perpendicular 46, the distances B2 and B1 from the lattice points A1 and A8 at both ends are obtained in a manner similar to the case of FIG. 14. The perpendicular 46 passing through the interpolation point 44 is extended to a boundary of the data set, thereby obtaining a boundary point 48. A distance L1 from the guarantee line intersecting point 45 to the interpolation point 44 and a distance L2 from the boundary point 48 to the interpolation point 44 are obtained. If the distances B1, B2, L1, and L2 from the positions out of the achromatic gradation guarantee line 42 in the unit data set 40 to the guarantee point 44 can be calculated as mentioned above, the non-linear conversion parameters VV1 to VV8 which refer to the eight lattice points A1 to A8 are calculated by the following equations.

$$VV1 = \frac{\{(V1 \div www) \times L1\} + \{(B1 \div B0) \times L2\}}{(L1 + L2)} \times www \quad (8)$$

$$VV2 = \frac{\{(V2 \div www) \times L1\}}{(L1 + L2)} \times www$$

$$VV3 = \frac{\{(V3 \div www) \times L1\}}{(L1 + L2)} \times www$$

$$VV4 = \frac{\{(V4 \div www) \times L1\}}{(L1 + L2)} \times www$$

$$VV5 = \frac{\{(V5 \div www) \times L1\}}{(L1 + L2)} \times www$$

$$VV6 = \frac{\{(V6 \div www) \times L1\}}{(L1 + L2)} \times www$$

$$VV7 = \frac{\{(V7 \div www) \times L1\}}{(L1 + L2)} \times www$$

$$VV8 = \frac{\{(V8 \div www) \times L1\} + \{(B2 \div B0) \times L2\}}{(L1 + L2)} \times www$$

In the calculation of the non-linear conversion parameters VV1 to VV8 according to the equations (8), for the linear conversion parameters V1 to V8 of the equations (5) obtained by linearly referring to all of the lattice points A1 to A8, the non-linear conversion is performed so as to increase a ratio of referring to the lattice points A1 and A8 at both ends of the guarantee line and to decrease a ratio of referring to the lattice points A2 to A7 out of the guarantee line as the interpolation point further approaches the achromatic gradation guarantee line 42. The equations (8) are general equations to obtain the non-linear conversion parameters VV1 to VV8. Now, assuming that the distance L1 from the perpendicular intersecting point 45 of the interpolation point 44 in FIG. 15 is equal to (L1=0), the interpolation point 44 is located on the achromatic gradation guarantee line 42 as shown in FIG. 14. Therefore, by substituting L1=0 into the equations (8), the equations (7) are derived. That is, when the interpolation point 44 exists on the achromatic gradation guarantee line 42 which is given by the equations (7), the equations (7) can be regarded as singular solutions of a general type of the equations (8). In FIG. 15, when the interpolation point 44 exists on the boundary of the data set, since L2=0, the equations (8) can be rewritten as follows.

$$VV1=V1$$

$$VV2=V2$$

$$VV3=V3$$

$$VV4=V4$$

$$VV5=V5$$

$$VV6=V6$$

$$VV7=V7$$

$$VV8=V8$$

Therefore, in the data set adjacent to the data set in which the interpolation calculation is performed by using the non-linear conversion parameters VV1 to VV8 in FIG. 15, the interpolation calculation is performed by using the linear conversion parameters V1 to V8. However, in the data set boundary, the interpolation calculation is performed by the linear conversion parameters V1 to V8. Thus, even if the data set of the non-linear conversion parameters and the data set of the linear conversion parameters mixedly exist, the output values at the interpolation point of the data set boundary are set to the almost same value, thereby guaranteeing the continuity of the interpolated output values at the data set boundary.

In the processes in steps S7 to S9 in FIGS. 13A and 13B corresponding to FIG. 15, first in step S7, the distances B1 and B2 between the lattice points A1 and A8 as two end points of the achromatic gradation guarantee line 42 and the intersecting point 45 of the perpendicular 46 fallen from the interpolation point 44 to the guarantee line are calculated. In step S8, subsequently, with respect to the perpendicular 46 fallen to the guarantee line, the distances L1 and L2 from the perpendicular intersecting point 45 of the guarantee line and the data set boundary 48 to the interpolation point 44 are calculated. In step S9, the non-linear conversion parameters VV1 to VV8 of the interpolation point out of the guarantee line are calculated in accordance with the equations (8). Processes in steps S10 to S15 are substantially the same as those in steps S4 to S9 in FIG. 12 and with respect to the positions of all of the interpolation points in the unit data set 40 as a cube whose one side is equal to the lattice interval (w=32), a process to obtain and store the non-linear conversion parameters VV1 to VV8 is performed.

Referring again to FIG. 11, each of the RGB/CMY conversion table, linear conversion parameters, and non-linear conversion parameters formed through the preparing processes in steps S1 to S3 is stored into the color converting apparatus 16 side as shown in FIG. 9 and the preparation for color conversion is completed. It will be obviously understood that the support preparing apparatus 18 is disconnected upon completion of the preparation and, after that, the color converting apparatus 16 solely functions. Step S4 and subsequent steps in FIG. 11 relate to the color converting process in the color converting apparatus 16 in FIG. 9. First in step S4, the RGB image data 28 serving as a converting source is inputted into the image memory 22 as shown in FIG. 9. In step S5, when the color converting process is activated by the controller 20, the controller 20 extracts the chrominance signal values, namely, RGB values of the conversion image data from the RGB image data 28 in the image memory 22 in accordance with a pixel arrangement and supplies them into the RGB/CMY conversion table 24. In step S6, a check is made to see if the inputted RGB values are the input values which give the lattice points of the conversion color space in the RGB/CMY conversion table 24 or not. If they are the input values which give the lattice points, step S7 follows and the CMY values set to the lattice points are read out. In step S9, they are outputted as chrominance signal values after the conversion. In step S10, a check is made to see if the processes of all of the chrominance signals have been finished. After that, the processing routine is again returned to step S5 and the next RGB chrominance signal values are inputted. In step S6, when the input RGB values do not correspond to the lattice points of the conversion coordinates space, an interpolation converting process in step S8 is executed. After completion of the interpolation converting process, the chrominance signal values after the interpolation are outputted in step S9. After that, the processes from step S5 are repeated until the processes for all of the chrominance signal values were finished in step S10. When the processes of all of the chrominance signals are finished, the color converted image data is outputted to the color printer 14 and is printed in step S11.

Figure 16:
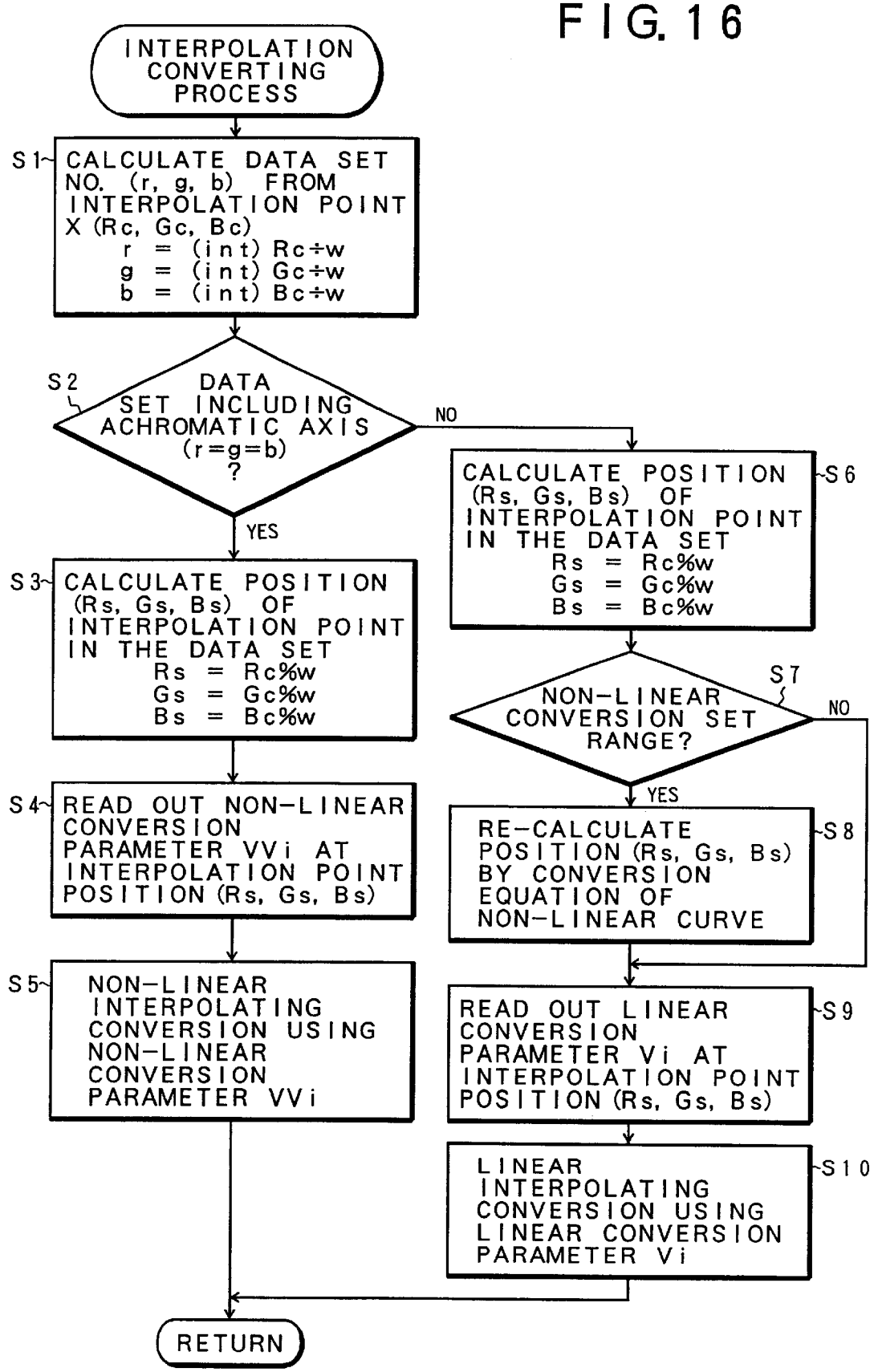
FIG. 16 is a flowchart for an interpolation converting process in FIG. 11.

FIG. 16 is a flowchart for the interpolation converting process in step S8 in FIG. 11. In the interpolation converting process of FIG. 16, first in step S1, a data set number is calculated with respect to an interpolation point which is given as input RGB values. Now, assuming that the position of the interpolation point is set to X(Rc, Gc, Bc), data set numbers (r, g, b) indicative of the position in the unit data set are calculated by the equations (6). In step S2, a check is made to see if the data set is a data set including the achromatic gradation guarantee axis as shown in the data set 40 in FIGS. 14 and 15. The discrimination about the data set including the achromatic axis is made by checking whether all of the data set numbers (r, g, b) calculated in step S1 are equal or not. If all of the data set numbers (r, g, b) are equal, since this means the data set including the achromatic axis, the processing routine advances to steps S3 to S5 and the interpolation calculation using the non-linear conversion parameters VV1 to VV8 is performed. On the other hand, when the data set numbers (r, g, b) are not equal, since this means the data set which does not include the achromatic axis, the interpolation calculation using the linear conversion parameters V1 to V8 is performed by the processes in steps S6 to S10. In the interpolation calculation using the non-linear conversion parameters VV1 to VV8 in steps S3 to S5, first in step S3, the position (Rs, Gs, Bs) of the interpolation point in the data set is calculated by the following equations.

$$Rs=(Rc)\%w$$

$$Gs=(Gc)\%w$$

$$Bs=(Bc)\%w \quad (9)$$

where, % denotes a remainder.

Subsequently in step S4, with reference to the non-linear conversion parameter storing unit 32 in FIG. 9 on the basis of the position (Rs, Gs, Bs) of the interpolation point in the data set, the corresponding non-linear conversion parameters VV1 to VV8 are read out. In step S5, the non-linear interpolation calculation using the non-linear conversion parameters VV1 to VV8 is performed by the following equations.

$$C=\{C1 \times VV8+C2 \times VV7+C3 \times VV6+C4 \times VV5+C5 \times VV4+C6 \times VV3+C7 \times VV2+C8 \times VV1\} \div (w \times w \times w)$$

$$M=\{M1 \times VV8+M2 \times VV7+M3 \times VV6+M4 \times VV5+M5VV4+M6 \times VV3+M7 \times VV2+M8 \times VV1\} \div (w \times w \times w)$$

$$Y=\{Y1 \times VV8+Y2 \times VV7+Y3 \times VV6+Y4VV5+Y5 \times VV4+Y6 \times VV3+Y7 \times VV2+Y8 \times VV1\} \div (w \times w \times w) \quad (10)$$

The CMY output values set in the lattice points A1 to A8 which are used in the interpolation calculation of the equations (10) show the following values.

A1:(C1, M1, Y1)

A2:(C2, M2, Y2)

A3:(C3, M3, Y3)

A4:(C4, M4, Y4)

A5:(C5, M5, Y5)

A6:(C6, M6, Y6)

A7:(C7, M7, Y7)

A8:(C8, M8, Y8)

When the CMY output values at the lattice points A1 to A8 are expressed by lattice point coordinates using the data set numbers, they are as shown by the following arrangements.

$C1=C[r, g, b]$ $C2=C[r+1, g, b]$ $C3=C[r, g+1, b]$ $C4=C[r+1, g+1, b]$ $C5=C[r, g, b+1]$ $C6=C[r+1, g, b+1]$ $C7=C[r, g+1, b+1]$ $C8=C[r+1, g+1, b+1]$ $M1=M[r, g, b]$ $M2=M[r+1, g, b]$ $M3=M[r, g+1, b]$ $M4=M[r+1, g+1, b]$ $M5=M[r, g, b+1]$ $M6=M[r+1, g, b+1]$ $M7=M[r, g+1, b+1]$ $M8=M[r+1, g+1, b+1]$ $Y1=Y[r, g, b]$ $Y2=Y[r+1, g, b]$ $Y3=Y[r, g+1, b]$ $Y4=Y[r+1, g+1, b]$ $Y5=Y[r, g, b+1]$ $Y6=Y[r+1, g, b+1]$ $Y7=Y[r, g+1, b+1]$ $Y8=Y[r+1, g+1, b+1]$

Therefore, the equations (10) of the interpolation calculation are actually defined as arrangements using those data set numbers.

The interpolation calculation using the linear conversion parameters V1 to V6 in the case where the achromatic axis is not included in the data set in steps S6 to S10 in FIG. 16 is as follows. First in step S6, the position (Rs, Gs, Bs) of the interpolation point in the data set is calculated in accordance with the equations (9) in a manner similar to the case in step S3. Subsequently, in step S7, a check is made to see if the CMY output values stored in the data set including the interpolation point as a target of the process at present lie within a range having non-linear characteristics. If the present data set lies within the range of the linear characteristics, step S9 follows and the corresponding linear conversion parameters V1 to V8 are read out with reference to the linear conversion parameter storing unit 32 in FIG. 9 on the basis of the position (Rs, Gs, Bs) of the interpolation point in the data set obtained in step S6. In step S10, the output values (Cx, Mx, Yx) of the interpolation point are calculated in accordance with the following equations.

$$C=\{C1 \times V8+C2 \times V7+C3 \times V6+C4 \times V5+C5 \times V4+C6 \times V3+C7 \times V2+C8 \times V1\} \div (w \times w \times w)$$

$$M=\{M1 \times V8+M2 \times V7+M3 \times V6+M4 \times V5+M5 \times V4+M6 \times V3+M7 \times V2+M8 \times V1\} \div (w \times w \times w)$$

$$Y=\{Y1 \times V8+Y2 \times V7+Y3 \times V6+Y4 \times V5+Y5 \times V4+Y6 \times V3+Y7 \times V2+Y8 \times V1\} \div (w \times w \times w) \quad (11)$$

On the other hand, when the output CMY values of the data set including the interpolation point lie within a range of strong non-linear characteristics in step S7, step S8 follows. With respect to the interpolation point X(Rc, Gc, Bc) inputted in step S1, a position X(Rc1, Gc1, Bc1) of the interpolation point is again calculated by applying the converting equations of the non-linear curve of the output CMY values. After that, with regard to the re-calculated interpolation point position, in a manner similar to step S6, the position (Rc, Gc, Bc) of the interpolation point in the data set is obtained by applying the equations (9). In step S9, the linear conversion parameters V1 to V8 are read out. In step S10, the output values (Cx, Mx, Yx) of the interpolation point which were re-calculated by the equations (11) in step S10 are calculated.

Figure 1A:
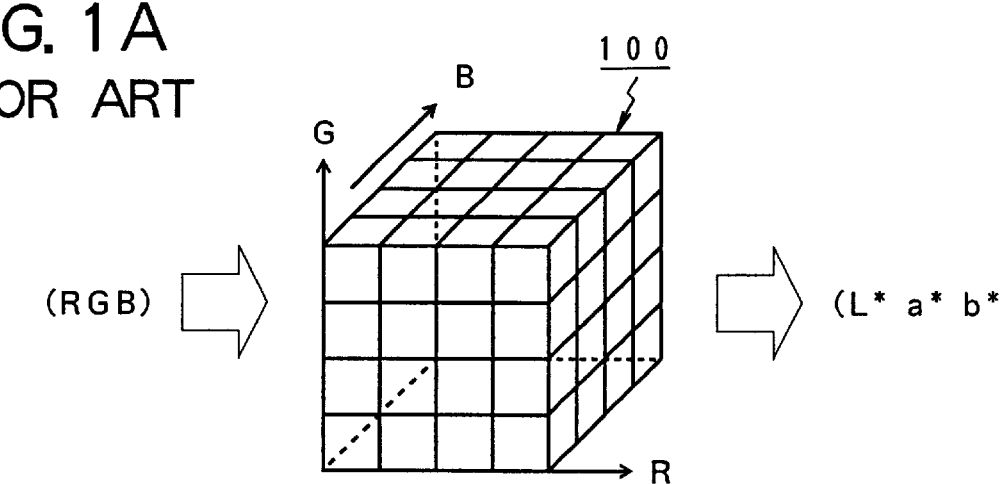
FIGS. 1A to 1C are schematic explanatory diagrams of a multidimensional conversion coordinates space of a color conversion.
Figure 1B:
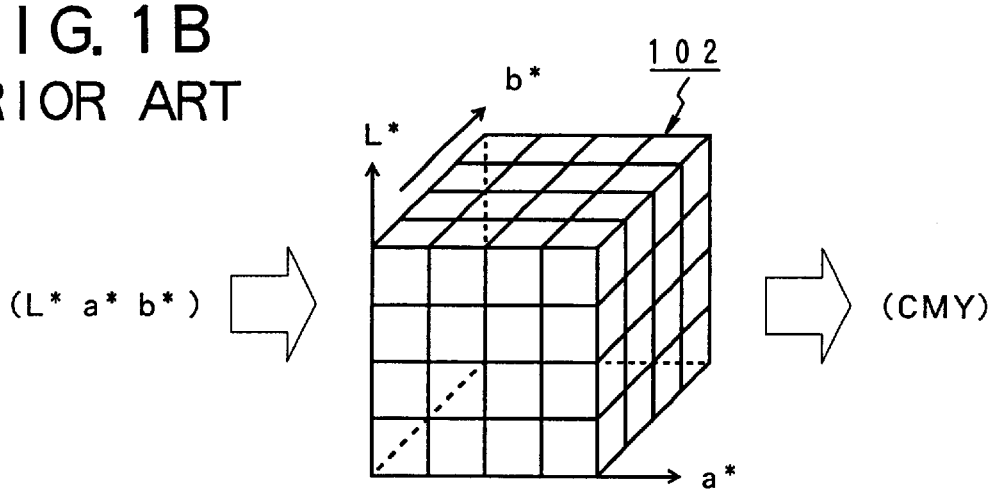
Figure 1C:
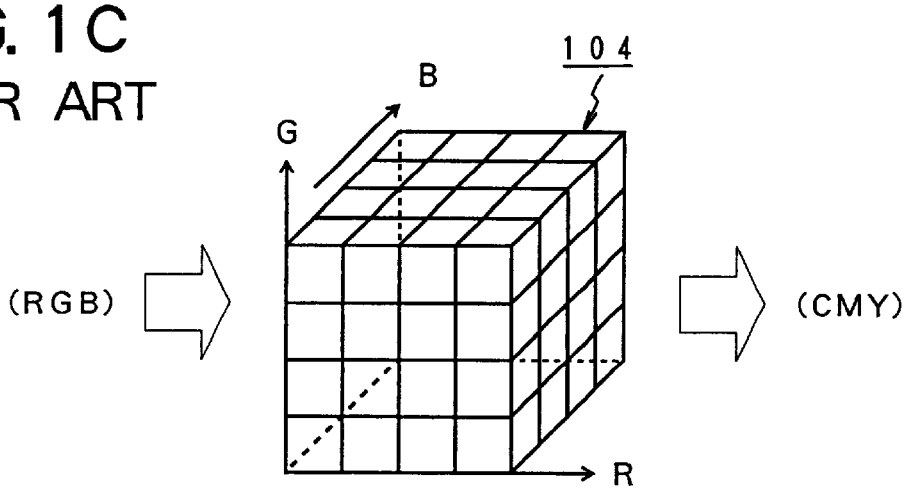
Figure 3:
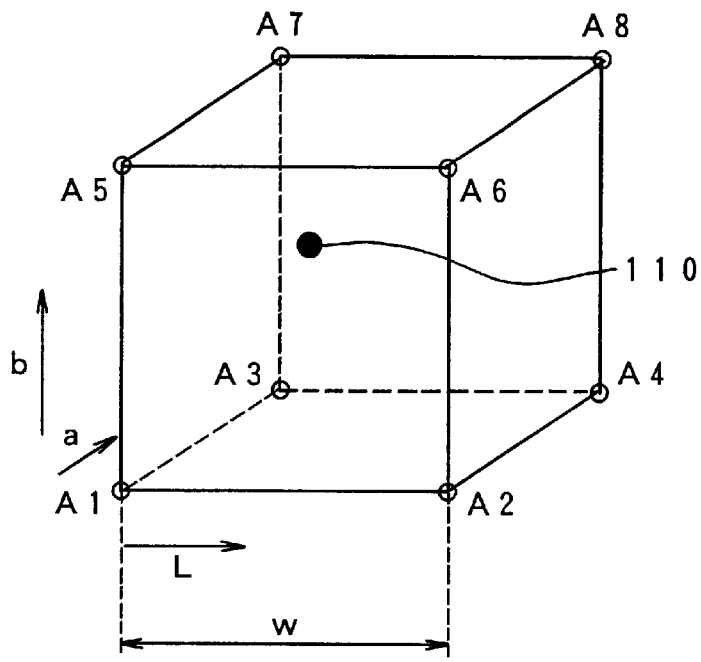
FIG. 3 is an explanatory diagram of lattice points and an interpolation point of a data set at the time of a linear interpolation by a cube interpolating method.
Figure 4:
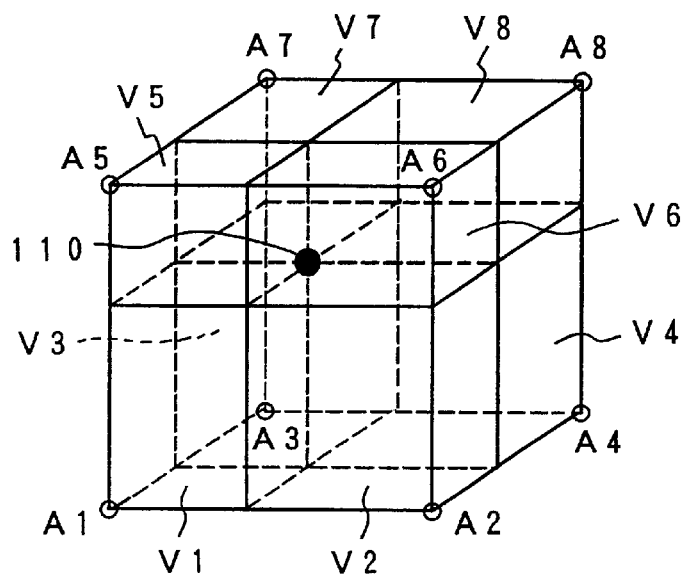
FIG. 4 is an explanatory diagram of a data set divided into a rectangular prism for a volume calculation of linear interpolation parameters.
Figure 5:
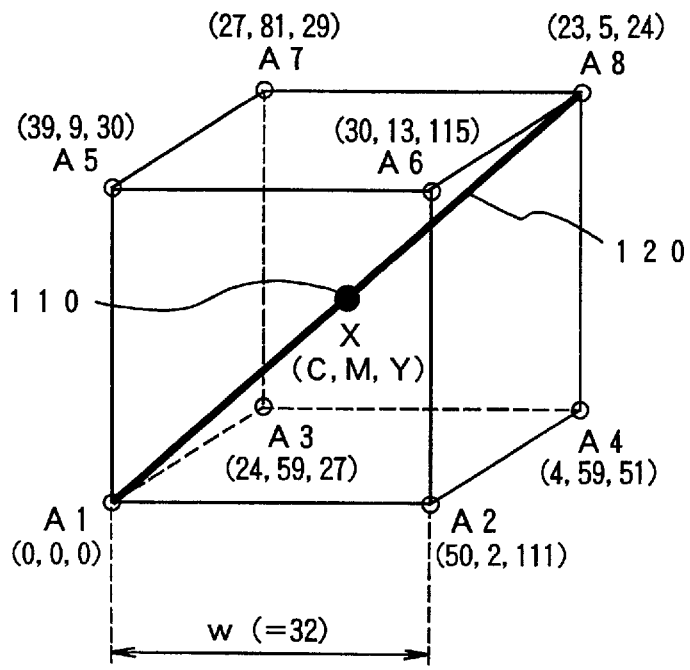
FIG. 5 is an explanatory diagram of a data set showing an inversion of an output value on an achromatic gradation guarantee line.
Figure 6:
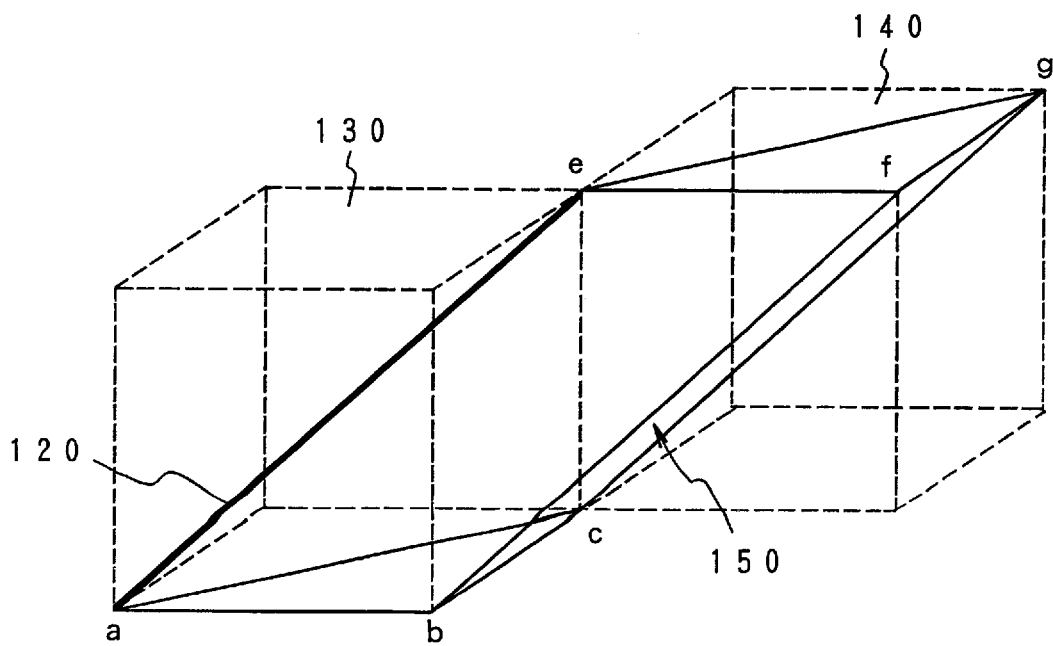
FIG. 6 is an explanatory diagram of a conventional interpolating method to prevent an inversion of an output color.
Figure 7:
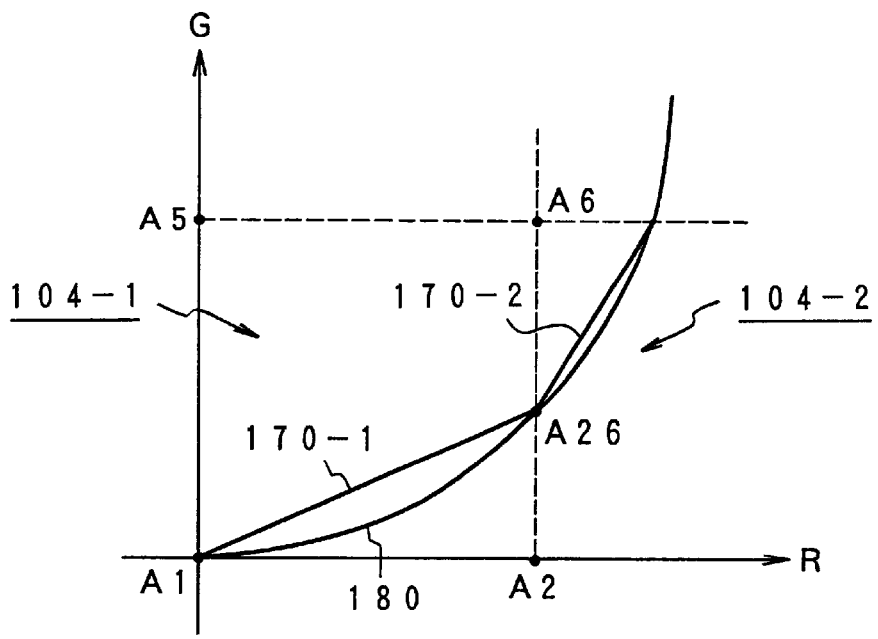
FIG. 7 is an explanatory diagram of a conversion error which is caused in a portion of strong non-linear characteristics with respect to an output color.
Figure 17:
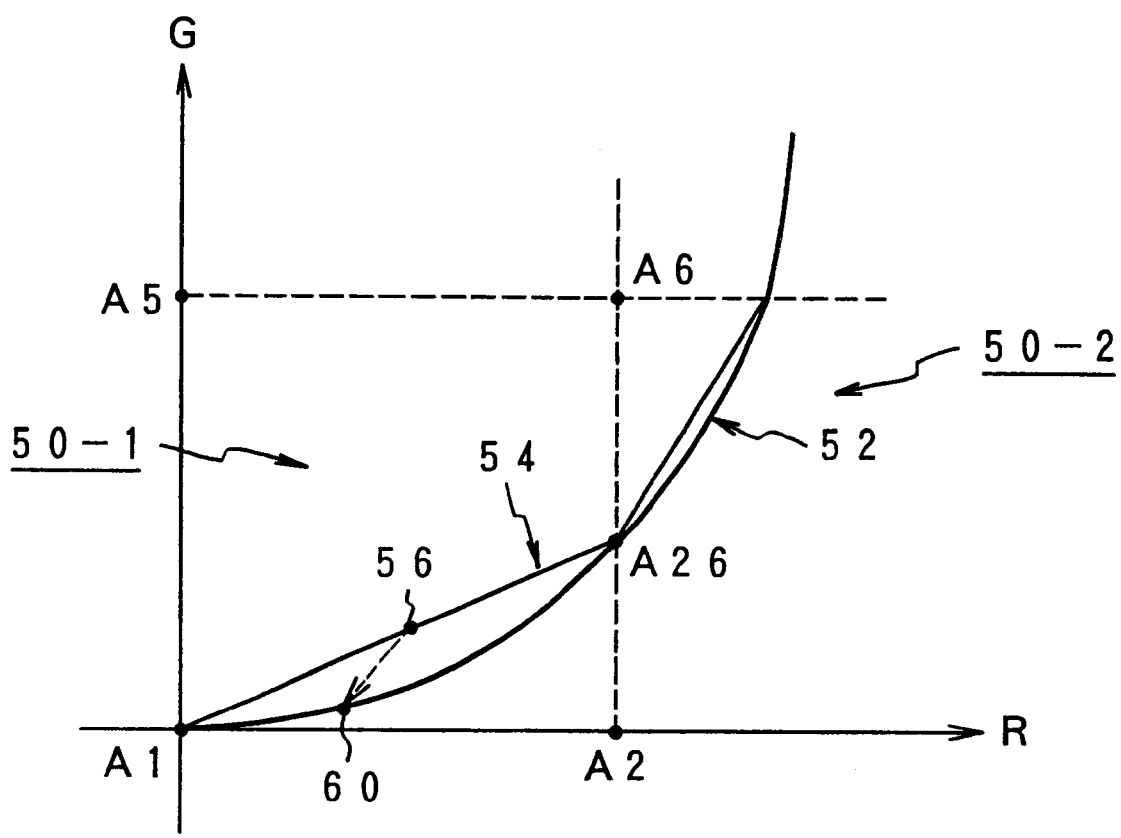
FIG. 17 is an explanatory diagram of re-calculation of an input color adapted to non-linear characteristics of an output color which is performed in a linear interpolation calculation in FIG. 16.

FIG. 17 is an explanatory diagram of the re-calculation of the interpolation point position by the non-linear characteristics of the CMY output values in step S8 in FIG. 16. FIG. 17 is a diagram of the RGB/CMY conversion coordinates space 104 of FIG. 2 when it is seen from the side of the G-R plane in a manner similar to FIG. 7. The CMY output values set in the lattice points A1 and A26 in a data set 50-1 change in accordance with a non-linear curve 52 of an index (1/γ) which gives a γ curve for the linear GR input values. Therefore, when the linear interpolation is performed with respect to the interpolation point between the lattice points A1 and A26, the CMY output values change in accordance with a straight line 54 and since there is a difference between the straight line 54 and non-linear curve 52, a conversion error increases. In step S8 in FIG. 16, therefore, the re-calculation of the position by the exponential function (1/γ) based on, for example, the γ curve is performed by the following equations to the input RGB values of an interpolation point 56 on the straight line 54.

$$R=(R1)^{1/\gamma} \times 255$$
$$G=(G1)^{1/\gamma} \times 255$$
$$B=(B1)^{1/\gamma} \times 255 \quad (12)$$

R1, G1, B1: values obtained by normalizing the input values (R, G, B) into a range of 0 to 1

The re-calculation to match to the non-linear curve is performed as follows. Each of the input values (R, G, B) which give the interpolation point is divided by the maximum value 255, the data set is normalized into the range of 0 to 1, the normalized input values (R1, G1, B1) are substituted into the equations (12) and are raised to the (1/γ)th power, subsequently, the resultant values are multiplied by the maximum value 255, and the normalized values are returned to the original absolute values. When this operation is now seen with respect to the data set 50-1 in FIG. 17, the interpolation point 56 of the straight line 54 is corrected to a re-calculation point 60 on the non-linear curve 52 by raising the G value and R value to the (1/γ)th power. Even in the conversion coordinates space in which the linear output CMY values have been stored in correspondence to the linear RGB input values by such a re-calculation, the output CMY values according to the characteristics of the non-linear curve can be outputted as interpolation values by the re-calculation of the position of the linear RGB input values. The non-linear curve can be also obviously applied to a proper non-linear curve other than the γ curve.

Figure 18:
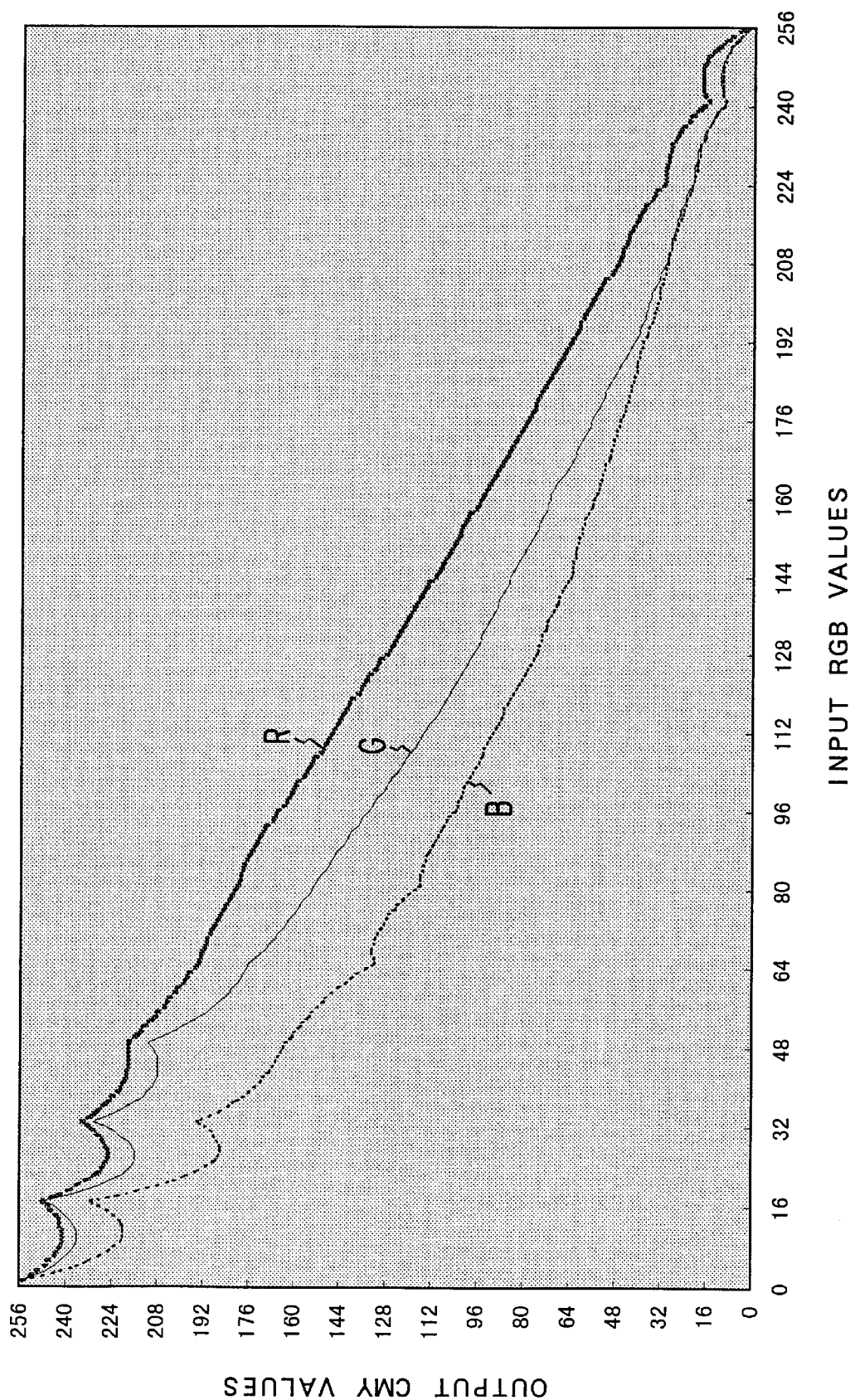
FIG. 18 is a characteristics diagram of output CMY values for input RGB values when an interpolation calculation is performed by using the linear conversion parameters on the achromatic gradation guarantee line.

FIG. 18 is a characteristics diagram of calculation results of the output CMY values obtained by performing the calculation with respect to the input RGB values on the achromatic axis of the RGB/CMY coordinates conversion space 104 in FIG. 2 by using the linear conversion parameters V1 to V8. In the interpolation calculation using the linear conversion parameters on the achromatic axis, since the input RGB values change like a ripple in a region of values lower than 64, a reverse phenomenon of the interpolation value occurs.

Figure 19:
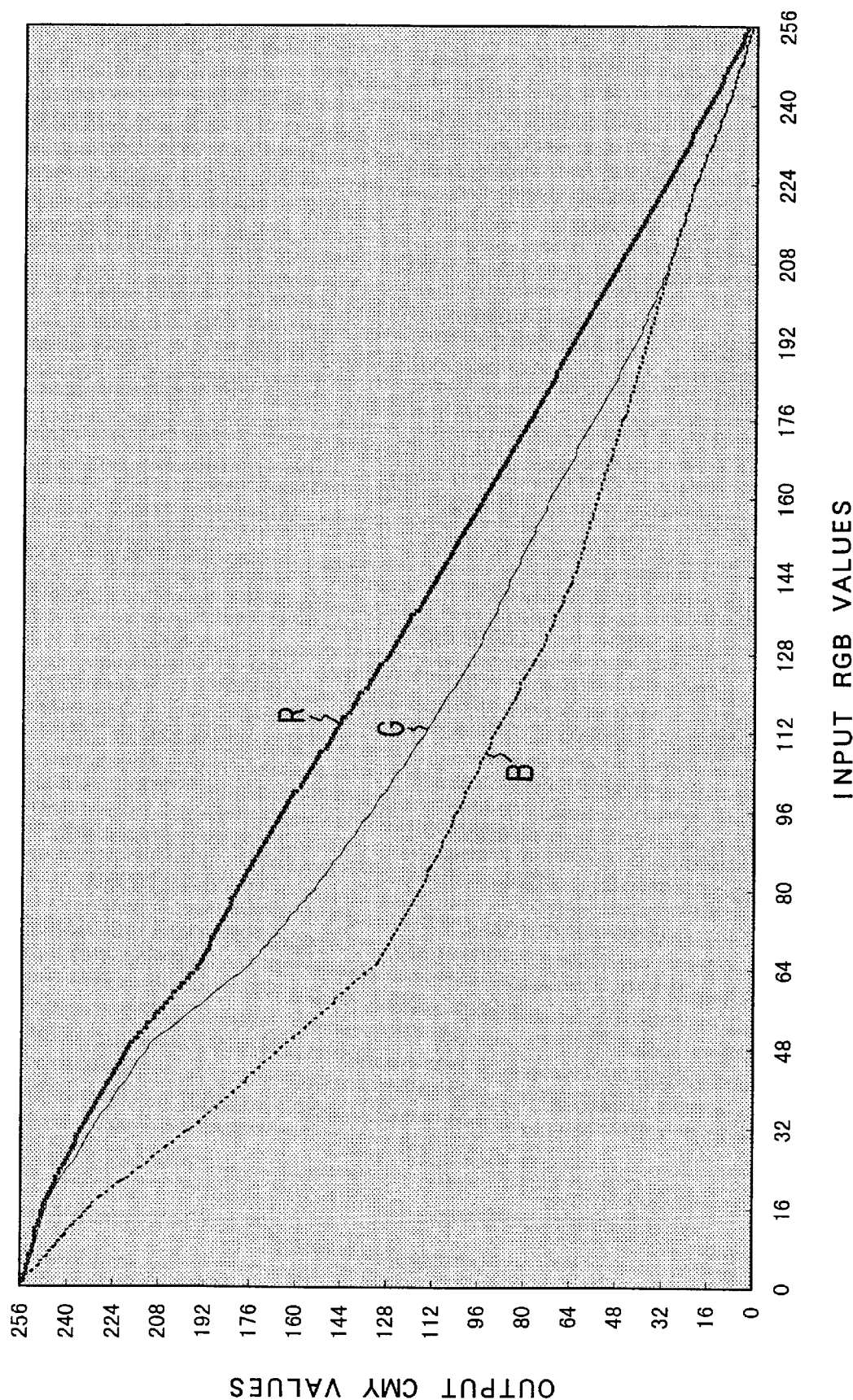
FIG. 19 is a characteristics diagram of output CMY values for input RGB values when an interpolation calculation is performed by using the non-linear conversion parameters on the achromatic gradation guarantee line.

FIG. 19 is a characteristics diagram of results of interpolation calculation of the output CMY values for the input RGB values on the achromatic axis using the non-linear conversion parameters VV1 to VV8 calculated newly in the invention, namely, the non-linear conversion parameters VV1 to VV8 of the equations (8). In the interpolation calculation using the non-linear conversion parameters VV1 to VV8, a ripple which causes a reversal of the interpolation value does not occur in the whole region of the input RGB values, an interpolation of a high precision in which the achromatic gradation having the directional property which changes from black to white is reproduced at a high fidelity is performed.

Figure 20:
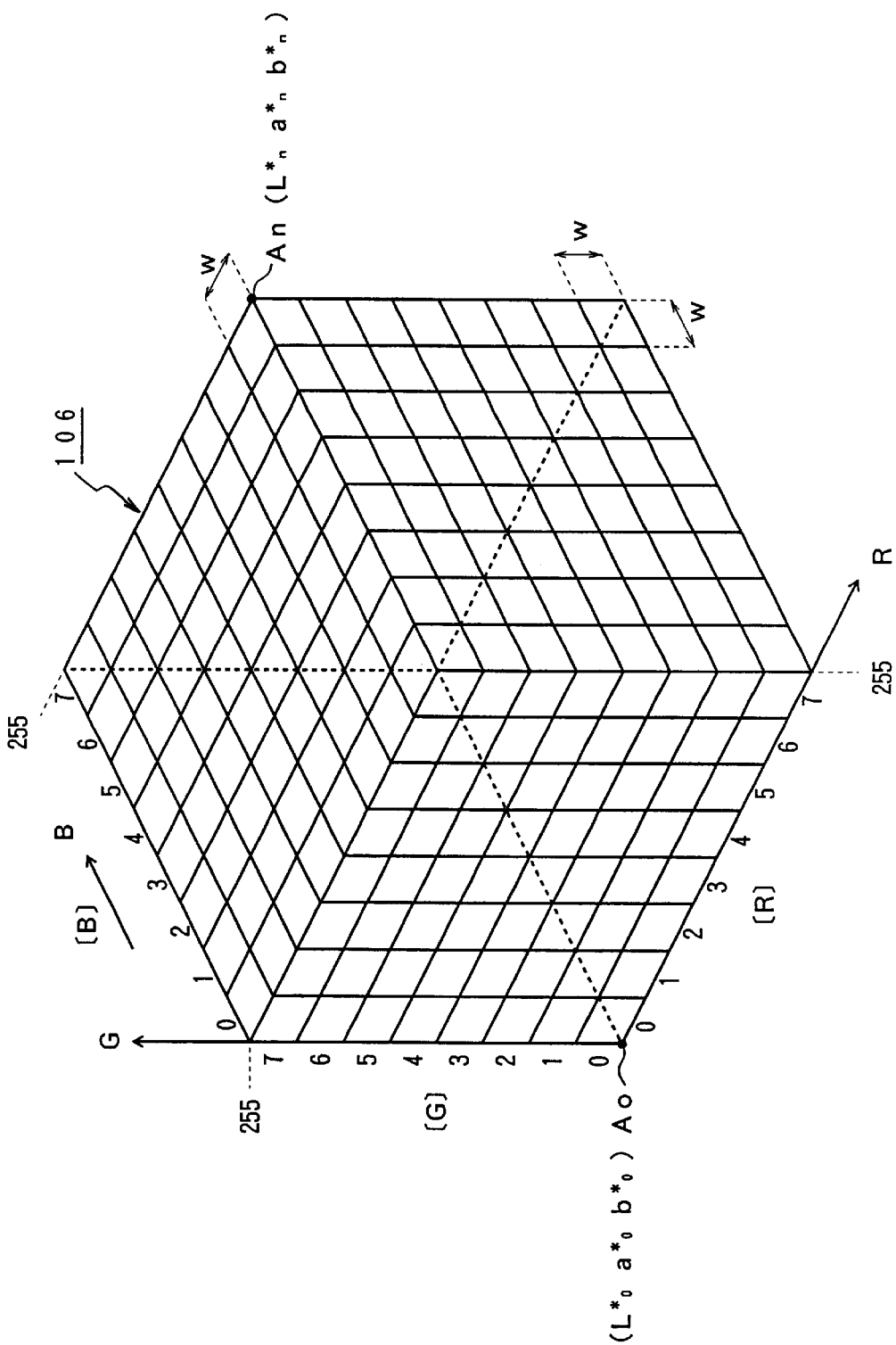
FIG. 20 is an explanatory diagram of a conversion coordinates space to convert an RGB input color into an L*a*b* output color.

The above embodiment relates to the example of the color converting method of converting the input RGB values into the output CMY values by using the RGB/CMY conversion table. However, as another color conversion, the invention can be also similarly applied to an interpolating process of the color conversion using a conversion table 106 of an RGB/Lab coordinates conversion space of FIG. 20 or a conversion table 108 of the Lab/CMY coordinates conversion space of FIG. 21. The interpolation calculations of the respective linear conversion parameters V1 to V8 and the non-linear conversion parameters VV1 to VV5 in case of using the RGB/Lab coordinates conversion space 106 of FIG. 20 are as follows. First, now assuming that the interpolation point position in the unit data set is equal to (Rs, Gs, Bs), the linear conversion parameters V1 to V8 are defined by the following equations.

$$V8=(w-Rs) \times (w-Gs) \times (w-Bs)$$
$$V7=Rs \times (w-Gs) \times (w-Bs)$$
$$V6=(w-Rs) \times Gs \times (w-Bs)$$
$$V5=Rs \times Gs \times (w-Bs)$$
$$V4=(w-Rs) \times (w-Gs) \times Bs$$
$$V3=Rs \times (w-Gs) \times Bs$$
$$V2=(w-Rs) \times Gs \times Bs$$
$$V1=RS \times Gs \times Bs \quad (13)$$

Output values (L*x, a*x, b*x) of the interpolation point using the linear conversion parameters V1 to V8 are calculated by the following equations.

$$L^*x=\{L^*1 \times V8+L^*2 \times V7+L^*3 \times V6+L^*4 \times V5+L^*5 \times V4+L^*6 \times V3+L^*7 \times V2+L^*8 \times V1\} \div (w \times w \times w)$$

$$a^*x=\{a^*1 \times V8+a^*2 \times V7+a^*3 \times V6+a^*4 \times V5+a^*5 \times V4+a^*6 \times V3+a^*7 \times V2+a^*8 \times V1\} \div (w \times w \times w)$$

$$b^*x=\{b^*1 \times V8+b^*2 \times V7+b^*3 \times V6+b^*4 \times V5+b^*5 \times V4+b^*6 \times V3+b^*7 \times V2+b^*8 \times V1\} \div (w \times w \times w) \quad (14)$$

The non-linear conversion parameters VV1 to VV8 are calculated by the equations (7) on the gradation guarantee line in a manner similar to the RGB/CMY conversion coordinates space and are calculated by the equations (8) at an interpolation point out of the gradation. The linear conversion parameters V1 to V8 which are used in the equations (8) in this case are equal to the values calculated by the equations (13). Interpolation calculations of output values (L*x, a*x, b*x) using the non-linear conversion parameters VV1 to VV8 are performed by the following equations.

$$L^*x = \{L^*1 \times VV8 + L^*2 \times VV7 + L^*3 \times VV6 + L^*4 \times VV5 + L^*5 \times VV4 + L^*6 \times VV3 + L^*7 \times VV2 + L^*8 \times VV1\} \div (w \times w \times w)$$

$$a^*x = \{a^*1 \times VV8 + a^*2 \times VV7 + a^*3 \times VV6 + a^*4 \times VV5 + a^*5 \times VV4 + a^*6 \times VV3 + a^*7 \times VV2 + a^*8 \times VV1\} \div (w \times w \times w)$$

$$b^*x = \{b^*1 \times VV8 + b^*2 \times VV7 + b^*3 \times VV6 + b^*4 \times VV5 + b^*5 \times VV4 + b^*6 \times VV3 + b^*7 \times VV2 + b^*8 \times VV1\} \div (w \times w \times w) \quad (15)$$

Figure 21:
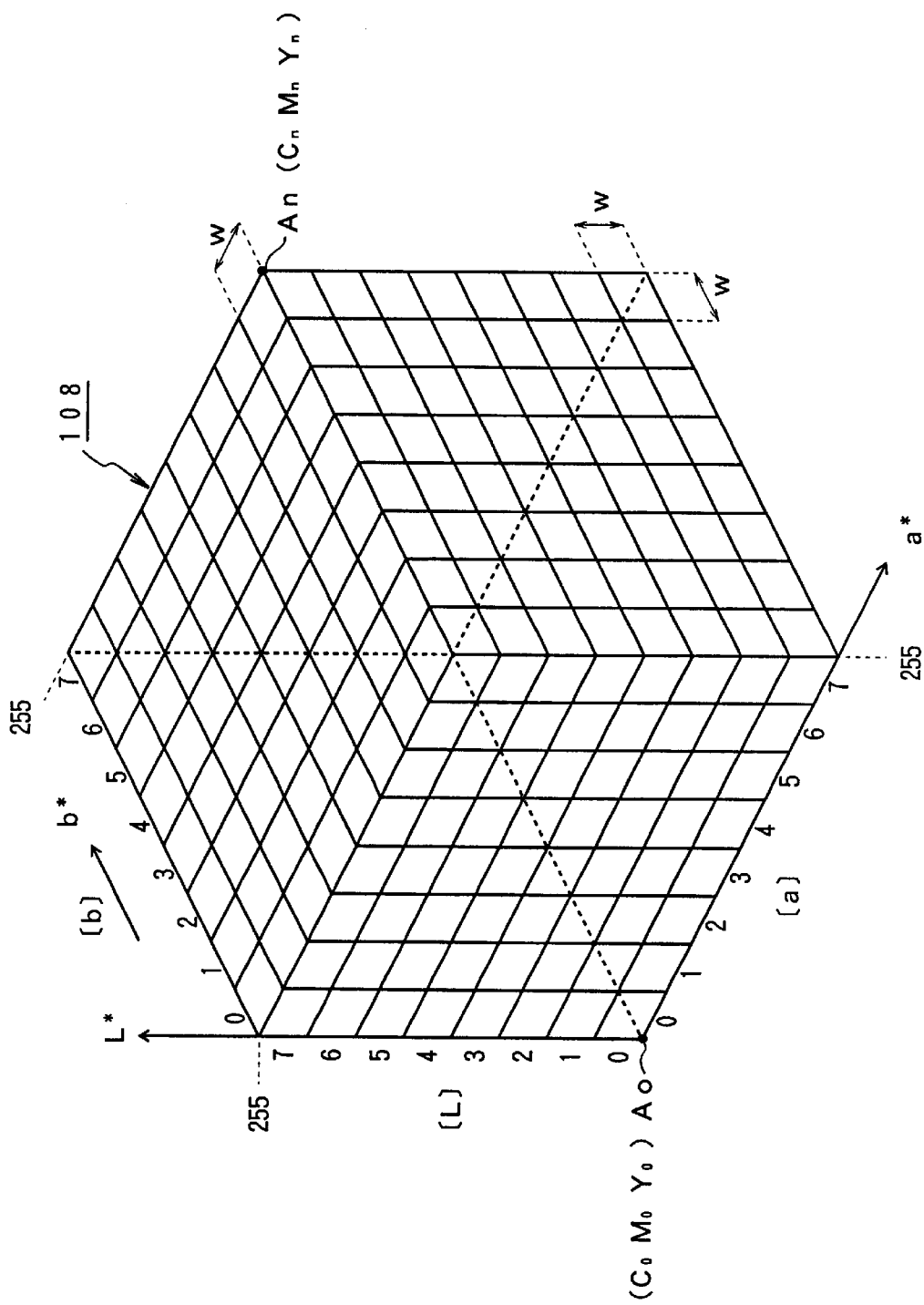
FIG. 21 is an explanatory diagram of a conversion coordinates space to convert an L*a*b* input color into a CMY output color.

Similarly, with respect to the Lab/CMY coordinates conversion space 108 in FIG. 21, the linear conversion parameters V1 to V8, non-linear conversion parameters VV1 to VV8, and the interpolation calculations based on those parameters will now be described as follows. Now, assuming that the position of the interpolation point in the unit data set is equal to (Ls, as, bs), the linear conversion parameters V1 to V8 are calculated by the following equations.

$$V8 = (w-Ls) \times (w-as) \times (w-bs)$$

$$V7 = Ls \times (w-as) \times (w-bs)$$

$$V6 = (w-Ls) \times as \times (w-bs)$$

$$V5 = Ls \times as \times (w-bs)$$

$$V4 = (w-Ls) \times (w-as) \times bs$$

$$V3 = Ls \times (w-as) \times bs$$

$$V2 = (w-Ls) \times as \times bs$$

$$V1 = Ls \times as \times bs \quad (16)$$

In a manner similar to the case of the RGB/CMY coordinates conversion space, the non-linear conversion parameters VV1 to VV8 are calculated by the equations (7) on the gradation guarantee line and are calculated by the equations (8) at a position out of the gradation guarantee line. As linear conversion parameters V1 to V8 which are used in the equations (8), the values calculated by the equations (16) are used. Further, the output values (Cx, Mx, Yx) of the interpolation points using the linear conversion parameters V1 to V8 are calculated by the following equations.

$$Cx = \{C1 \times V8 + C2 \times V7 + C3 \times V6 + C4 \times V5 + C5 \times V4 + C6 \times V3 + C7 \times V2 + C8 \times V1\} \div (w \times w \times w)$$

$$Mx = \{M1 \times V8 + M2 \times V7 + M3 \times V6 + M4 \times V5 + M5 \times V4 + M6 \times V3 + M7 \times V2 + M8 \times V1\} \div (w \times w \times w)$$

$$Yx = \{Y1 \times V8 + Y2 \times V7 + Y3 \times V6 + Y4 \times V5 + Y5 \times V4 + Y6 \times V3 + Y7 \times V2 + Y8 \times V1\} \div (w \times w \times w) \quad (17)$$

Further, the output values (Cx, Mx, Yx) based on the non-linear conversion parameters VV1 to VV6 are calculated by the following equations.

$$Cx = \{C1 \times VV8 + C2 \times VV7 + C3 \times VV6 + C4 \times VV5 + C5 \times VV4 + C6 \times VV3 + C7 \times VV2 + C8 \times VV1\} \div (w \times w \times w)$$

$$Mx = \{M1 \times VV8 + M2 \times VV7 + M3 \times VV6 + M4 \times VV5 + M5 \times VV4 + M6 \times VV3 + M7 \times VV2 + M8 \times VV1\} \div (w \times w \times w)$$

$$Yx = \{Y1 \times VV8 + Y2 \times VV7 + Y3 \times VV6 + Y4 \times VV5 + Y5 \times VV4 + Y6 \times VV3 + Y7 \times VV2 + Y8 \times VV1\} \div (w \times w \times w) \quad (18)$$

As described above, according to the invention, the interpolation calculation using the non-linear conversion parameters of a high precision which guarantee the directional property of the gradation and the interpolation calculation using the linear conversion parameters which can be processed at a high speed are provided. The interpolation calculation using the non-linear conversion parameters of a high precision is performed only with respect to the region where it is necessary to guarantee the gradation. The interpolation calculation using the linear conversion parameters which can be processed at a high speed is performed with respect to the remaining portions. Thus, the reversal of the output color due to the interpolation in the region including the gradation axis such as an achromatic color or the like is certainly prevented. As a whole, the color conversion of a high precision in which an influence on the performance is small can be performed.

According to the invention, in the case where it is intended to provide specific non-linear conversion parameter characteristics, for example, γ characteristics to the output color by using the multi-dimensional conversion table set in accordance with the selection relation between the input color and the output color, after the re-calculation to convert the input color at the interpolation point into the position based on the non-linear characteristics was performed, the output values of the interpolation point which was re-calculated are calculated by the linear interpolation calculation. Thus, even in the multi-dimensional conversion table having the linear converting characteristics, the output values corresponding to the non-linear characteristics of the output color are obtained by the interpolation. The conversion error for the non-linear output characteristics when the linear interpolation is performed can be remarkably reduced.

Although the above embodiment has been described with respect to the example of the case where the lattice width (w) to decide the size of data set is set to (w=32), the lattice interval (w) can be properly determined as necessary. Although the above embodiment has been described with respect to the example of the conversion in the color spaces of RGB and CMY of the colorimetric system and L*, a*, and b* of the luminance color difference separation system, the invention can be also similarly applied to the conversion in two different color spaces including color spaces such as CIEXYZ and YCbCr or the like besides the above color spaces.

The invention is not limited to the foregoing embodiment but incorporates many proper modifications within the purview without departing from the objects and advantages of the invention. Further, the invention is not limited by the numerical values shown in the above embodiment.

What is claimed is:

1. A color converting method comprising:

a conversion table forming step of forming a multi-dimensional conversion table in which an output color of a second color space corresponding to an input color of a first color space has been stored at each lattice point in a multi-dimensional conversion coordinates space having predetermined lattice intervals;

a linear conversion parameter calculating step of calculating linear conversion parameters which are used in an interpolation calculation of an output color corresponding to an input color at a point other than the lattice points in said conversion coordinates space;

a non-linear conversion parameter calculating step of calculating non-linear conversion parameters which are used in the interpolation calculation of the output color corresponding to the input color at a point other than the lattice points in said conversion coordinates space;

a discriminating step of discriminating whether said linear conversion parameters are used or said non-linear conversion parameters are used each time the input color of said first color space is fetched;

a linear interpolation calculating step of interpolation calculating an output color at an interpolation point by using said linear conversion parameters discriminated in said discriminating step; and a non-linear interpolation calculating step of interpolation calculating the output color at the interpolation point by using said non-linear conversion parameters discriminated in said discriminating step.

2. A method according to claim 1, wherein in said linear conversion parameter calculating step, with respect to a unit lattice space (data set) constructing said conversion coordinates space, it is regarded that the output color at the interpolation point in said unit lattice space linearly changes from a minimum value to a maximum value, and linear conversion parameters V1 to V8 corresponding to relative output colors at eight lattice points in said unit lattice space surrounding the interpolation point are calculated every interpolation point and are held.

3. A method according to claim 2, wherein in said linear conversion parameter calculating step, an inside of said unit lattice space is divided into eight spaces so as to include each of the eight lattice points around a position of the interpolation point, and volumes of said divided spaces are calculated as linear conversion parameters V1 to V8.

4. A method according to claim 1, wherein in said non-linear conversion parameter calculating step, with respect to a unit lattice space (data set) constructing said conversion coordinates space, it is regarded that the output color at each interpolation point linearly changes on a guarantee line of a gradation connecting two lattice points and that the output color at each interpolation point non-linearly changes in other portions, and non-linear conversion parameters VV1 to VV8 corresponding to eight lattice points surrounding said guarantee line are calculated in a manner such that as the interpolation point approaches said guarantee line, a ratio of referring to the lattice points at both ends of said guarantee line is increased and a ratio of referring to the lattice points out of said guarantee line is decreased.

5. A method according to claim 1, wherein in said discriminating step, a check is made to see if a lattice space to which the input color of said first color space belongs includes a guarantee line of an achromatic gradation, the interpolation calculation using said non-linear conversion parameters is selected in the case where it is determined that said guarantee line is included, and the interpolation calculation using said linear conversion parameters is selected in the case where it is decided that said guarantee line is not included.

6. A method according to claim 5, wherein in said discriminating step, in the case where said first color space is an RGB space, a position (r, g, b) of a lattice space to which an input color (R, G, B) belongs is calculated by using a lattice width (w) of the lattice space by setting $r = (\text{int}) R \div w$ $g = (\text{int}) G \div w$ $b = (\text{int}) B \div w$ where, (int) denotes a process to round to an integer by omission when $r = g = b$ is satisfied, it is determined that said guarantee line is included, the interpolation calculation using said non-linear conversion parameters is selected, and when $r = g = b$ is not satisfied, it is decided that said guarantee line is not included, and the interpolation calculation using said linear conversion parameters is selected.

7. A method according to claim 1, wherein in said discriminating step, a pre-designated result is discriminated, thereby selecting the interpolation calculation using said linear conversion parameters or the interpolation calculation using said non-linear conversion parameters.

8. A method according to claim 2, wherein in said linear interpolation calculating step, as an output color at the interpolation point, output colors at the eight lattice points of a lattice space to which said interpolation point belongs are weighted by said linear conversion parameters corresponding to a position of the interpolation point in said lattice space, and a mean of the weighted output colors is calculated.

9. A method according to claim 1, wherein in said linear interpolation calculating step, in case of setting predetermined non-linear characteristics into the output color by using said multi-dimensional conversion table in which the input color and the output color are set by a linear relation, a re-calculation to convert the input color at said interpolation point into a position based on said non-linear characteristics is performed and, after that, an output color at the re-calculated interpolation point is calculated.

10. A method according to claim 9, wherein in said linear interpolation calculating step, after an input color (Rc, Gc, Bc) at the interpolation point was converted into a position (Rn, Gn, Bn) of a lattice space by normalizing by dividing said input color by a maximum color value, said position is converted into said non-linear characteristics, subsequently, the input color at the interpolation point according to said non-linear characteristics is re-calculated by multiplying a conversion calculation value by said maximum color value, and an output color corresponding to the re-calculated input color at the interpolation point is calculated.

11. A method according to claim 1, wherein in said non-linear interpolation calculating step, as an output color at the interpolation point, output colors at eight lattice points in a lattice space to which said interpolation point belongs are weighted by the non-linear conversion parameters at the respective lattice points, and a mean of the weighted output colors is calculated.

* * * * *

UNITED STATES PATENT AND TRADEMARK OFFICE
CERTIFICATE OF CORRECTION

PATENT NO. : 6,335,734 B1
DATED : January 1, 2002
INVENTOR(S) : Akiko Nagae et al.

It is certified that error appears in the above-identified patent and that said Letters Patent is hereby corrected as shown below:

<u>Title page,</u>
Item [54] change, "COLOR CONVERTING METHOD" to -- MULTIDIMENSIONAL COLOR CONVERSION TABLE FOR CONVERTING A CHROMINANCE SIGNAL HAVING A DIFFERENT COLOR SPACE --

Signed and Sealed this

Nineteenth Day of March, 2002

Attest:

JAMES E. ROGAN
*Director of the United States Patent and Trademark Office*

*Attesting Officer*